US007525688B2

(12) United States Patent
Matsushima

(10) Patent No.: US 7,525,688 B2
(45) Date of Patent: Apr. 28, 2009

(54) IMAGE PROCESSING APPARATUS, IMAGE PROCESSING METHOD AND INFORMATION RECORDING MEDIUM

(75) Inventor: Yuki Matsushima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/812,631

(22) Filed: Jun. 20, 2007

(65) Prior Publication Data

US 2008/0002216 A1    Jan. 3, 2008

Related U.S. Application Data

(62) Division of application No. 10/163,305, filed on Jun. 7, 2002, now Pat. No. 7,251,056.

(30) Foreign Application Priority Data

Jun. 11, 2001  (JP)  ............... 2001-175619
Jun. 12, 2001  (JP)  ............... 2001-176455
Aug. 29, 2001  (JP)  ............... 2001-259224

(51) Int. Cl.
  *G06F 3/08*  (2006.01)
(52) U.S. Cl. ............ 358/1.9; 358/518; 358/521; 382/162; 382/168
(58) Field of Classification Search ............ 382/162, 382/167, 168, 171; 358/1.9, 464, 518, 519, 358/520, 521, 522, 523
See application file for complete search history.

(56) References Cited

U.S. PATENT DOCUMENTS

| 5,123,060 | A | 6/1992 | Cho et al. |
| 5,164,993 | A | 11/1992 | Capozzi et al. |
| 5,696,889 | A | 12/1997 | Morikawa |
| 5,889,928 | A | 3/1999 | Nakamura et al. |
| 6,333,993 | B1 * | 12/2001 | Sakamoto ............ 382/173 |
| 6,694,051 | B1 | 2/2004 | Yamazoe et al. |
| 6,873,729 | B2 | 3/2005 | Matsushima |

FOREIGN PATENT DOCUMENTS

| JP | 5-91324 | 4/1993 |
| JP | 5-236340 | 9/1993 |
| JP | 06-14193 | 1/1994 |
| JP | 7-301867 | 11/1995 |
| JP | 07322093 A | 12/1995 |
| JP | 09312777 A | 12/1997 |
| JP | 10-79885 | 3/1998 |
| JP | 10126619 A | 5/1998 |
| JP | 11-088679 | 3/1999 |
| JP | 2000-134467 | 5/2000 |
| JP | 2001-320514 A | 11/2001 |

* cited by examiner

*Primary Examiner*—Thomas D Lee
(74) *Attorney, Agent, or Firm*—Dickstein Shapiro LLP

(57) ABSTRACT

A subject area extracting unit extracts a main-subject area from the color image data; a correction amount calculating unit calculates a gradation correction amount based on the information on the thus-extracted main-subject area; a control zone extracting unit extracts a predetermined control zone from a brightness zone to which the main-subject area does not belongs; a determining unit determines whether or not the gradation correction amount on the control zone should be controlled, according to a predetermined control requirement; and a control unit controls the gradation correction amount according to the determination result of the determination unit.

8 Claims, 37 Drawing Sheets

EXTRACTED SUBJECT AREA (BLACK PART)

BACKGROUND CANDIDATE AREA

BACKGROUND CANDIDATE AREA

IMAGE PROCESSING APPARATUS, IMAGE PROCESSING METHOD AND INFORMATION RECORDING MEDIUM

This Application is a U.S. divisional patent application of U.S. patent application Ser. No. 10/163,305, filed Jun. 7, 2002, now U.S. Pat. No. 7,251,056 which claims the priority from Japanese Application Nos. JP-2001-175619, filed Jun. 11, 2001; JP-2001-176455, filed Jun. 12, 2001; and JP-2001-259224, filed Aug. 29, 2001, the complete disclosures of which are incorporated herein by reference.

BACKGROUND OF THE INVENTION

1. Field of the Invention

The present invention relates to an image processing apparatus in an image output system, a printer system, an image display system, etc., having a function of automatically correcting the gradation of color image data, such a technology being able to be applied to a digital camera, a scanner, etc.

2. Description of the Related Art

In recent years, the opportunity to treat a photograph image as digitized data is increasing upon spread of a personal computer, Internet, a home printer, and also, enlargement of the storage capacity of a hard disk drive, etc. Generally in connection therewith, a digital camera, a film scanner, etc. are used as means for inputting digital photograph image data (referred simply as image data, hereinafter).

An automatic exposure control device for always keeping the exposure at a time of photography the optimum is provided in a digital camera. Although there are various methods in an exposure control type, a method for dividing a screen into a plurality of areas for light amount detection, applying an weight for each area, and taking a weighted average thereof, and, then, based thereon, adjusting an iris diaphragm, shutter speed, etc. of the camera is commonly used.

However, in such an exposure control method, a problem may occur. Especially, in a backlight state in which a light source exists behind a main photographic subject where there is a large luminance difference between the background and the main photographic subject, the exposure may be corrected in minus direction by an automatic exposure control function as a result of being influenced by the background brightness when the exposure does not suit the photographic subject, and, as a result, the photographic subject becomes dark in a resulting picked-up image.

Further, in a photography in the night by using a stroboscope light/flash light, since it is the requisite that stroboscope light shines upon a photographic subject, an iris diaphragm and shutter speed of the camera are fixed to defaults. As a result, if the distance between the stroboscope and the photographic subject is too far, the light does not arrive at the subject, and, thus, the photographic subject becomes dark in a resulting picked-up image also in this case.

There, the exposure correction function may be provided for adjusting the brightness of a photographic subject which has unsuitable brightness with respect to the scene to the brightness suitable to the scene. For example, a photographic subject having become generally dark due to underexposure, or a photographic subject having become dark due to backlight may be made brighter thereby. Alternatively, a photographic subject on the overexposure may be made darker thereby.

The exposure correction in a camera employs a common method for altering an iris diaphragm and a shutter speed of the camera, in order to adjust receiving light amount in a lens. Moreover, in a case of a printer or a display device, the exposure correction function for optimizing the brightness of an output signal with respect to the brightness of an input signal etc. using an input-to-output conversion/transformation function (gradation correcting curve) etc. may be provided.

Since correcting the exposure so as to adjust the brightness of image data described above and the gradation correction processing according to the present invention have the same purpose, they are both referred to as gradation correction processing, hereinafter.

Various methods have been proposed for automatically performing gradation correction of image data for coping with unsuitable exposure control such as those described above performed in image pickup occasions.

For example, according to an image processing method, a main image feature quantity of an original image is calculated by reading the whole original image, a predetermined density range of a photographic subject is calculated from the calculated main image feature quantity, and only the pixels falling within the above-mentioned predetermined density range are extracted from the whole original image, and an original image feature quantity is determined therefrom. Then, from the thus-obtained original image feature quantity, an exposure amount is determined. Thereby, the exposure correction is performed appropriately on an image such as backlight image in which a density difference between the background and photographic subject is large (see Japanese laid-open patent application No. 7-301867).

Moreover, according to another image processing method, a conversion curve through which image data conversion is made so that saturation does not take place throughout the image is created, and therethrough, backlight correction is performed (see Japanese laid-open patent application No. 10-79885).

An image processing method disclosed in Japanese laid-open patent application No. 10-79885 sets a refraction instruction value at a low luminance portion in an input image. Then, as an output value for the refraction instruction value, a value "220" which is somewhat smaller than the maximum luminance value "255" is selected. Then, a conversion table is created in which this point is regarded as a refraction point, and until an input luminance value reaches the refraction point, the relationship between the input and output is linear along a straight line between the original point and the refraction point. Then, after that, the relationship between the input and output is linear along a straight line between the refraction point and the input/output maximum coordinate point (255, 255). Then, by using the created conversion table, an input luminance is converted and output. Thereby, a shadow part occurring in a backlight image is made brighter, while gradation crush in a brighter part is avoided. Gradation crush means that originally different gradation levels become the same level, hereinafter.

According to Japanese laid-open patent application No. 2000-134467, an image data which shows a relevant image is input, a histogram on this image is created, and, based on this histogram, it is determined whether or not the relevant image is a backlight image. Then, according to the determination result, image processing conditions are set up, and, thus, it is possible to perform image processing suitable to the backlight scene.

However, it is difficult to appropriately correct the brightness on a photographic subject so that satisfactory gradation expression is ensured while excessive correction is avoided. When a correction amount is derived only from the value on the photographic subject as in the art disclosed in Japanese laid-open patent application No. 7-301867, gradation crush may occur in background, gradation crush or hue displacement/deviation may occur on high chroma color.

Further, in case a gradation correction curve is created as in Japanese laid-open patent application No. 10-79885, and color processing is performed according to the gradation correction curve, the luminance component is avoided from being saturated, a color component may be saturated and it may cause gradation crush or hue saturation. Moreover, when the gradation correction curve is set up so that saturation be avoided from occurring throughout the image, the correction may not function effectively.

Since the brightness differs between a photographic subject and a background extremely in the above-mentioned night photography or backlight photography, the photographic subject may be extracted from the image, and the exposure may be determined therefrom, as mentioned above.

In this regard, various technologies of extracting the photographic subject have been proposed. For example, according to one method, a portion in which a flesh color occur many times is extracted from an image, i.e., extraction is made mainly for a face of human being. According to another method, a portion having a large edge amount is determined as a focused area, and, thus, is determined as a photographic subject.

However, it is difficult to extract an area having a fixed color such as flesh color from an image obtained through unsuitable exposure control. Further, since a focusing is made even in detail of an image picked up by a digital camera depending on the size of image-pickup device, the edge amount becomes larger in background in a backlight image in which a photographic subject is darker than the background and also there is little contrast, and, thus, extraction preciseness for the photographic subject is not satisfactory.

On the other hand, Japanese laid-open patent application No. 5-236340, for example, discloses a method of removing the background, instead of extracting the photographic subject. In this method, comparison is made on luminance and hue of arbitrary pixel with known average luminance and average hue of background image, and, in case the different therebetween is larger than a predetermined threshold, the pixel is regarded as a pixel of the photographic subject. In this method the threshold is changed according to the average luminance and average hue of the background image.

However, according to this method, it is necessary that information on the background is previously known. Furthermore, problematically the obtained average hue becomes a hue different from any hues included in the background in case various colors are included there evenly. If so, this information cannot be used as a proper extraction determination reference.

According to Japanese laid-open patent application No. 5-91324, an image is divided into a plurality of blocks/divisions, density information is obtained every block, and, thereby, background blocks are extracted. Thus, according to this method, a density average value DM on respective pixels, a density average value Dn on each block, and an average scattering value Sn thereof are obtained. Then, densities of peripheral blocks and density continuity are determined from Dn and Sn. Thus, the background is determined.

However, according to this method, as the background is extracted by using density information, image parts having completely different colors may be extracted as the background in case they have same density. Accordingly, it may not be possible to perform highly precise determination (background extraction determination).

SUMMARY OF THE INVENTION

An object of the present invention is to provide an improved image processing scheme of correcting image data of a photograph or the like taken in an inappropriate exposure condition, with maintaining a gradation, and also, avoiding excessive correction from occurring.

An image-processing apparatus according to the present invention having a function of correcting a gradation of color image data, includes:

a subject area extracting unit extracting a main-subject area from the color image data;

a correction amount calculating unit calculating a gradation correction amount based on the information on the thus-extracted main-subject area;

a control zone extracting unit extracting a predetermined control zone from a brightness zone to which the main-subject area does not belong;

a determining unit determining whether or not the gradation correction amount on the control zone should be controlled, according to a predetermined control requirement; and a control unit controlling the gradation correction amount according to the determination result of the determination unit.

Thereby, it is possible to avoid excessive correction from occurring on a highlight zone or a shadow zone, and, also, to achieve gradation correction suitable to a particular scene of the relevant image and/or to an image output device to be applied.

Another object of the present invention is to provide an improved image processing scheme of correcting image data taken in an inappropriate exposure condition, by correcting the brightness on a main subject appropriately, without causing gradation crush, or hue deviation, and, also, avoiding excessive correction on image data taken in a proper exposure condition.

An image processing apparatus according to another aspect of the present invention includes:

a control area extracting unit extracting a candidate area on which gradation crush is likely to become conspicuous; and a gradation correction adjustment unit updating a gradation correction curve using information on the control area.

Thereby, it is possible to perform gradation correction appropriately by avoiding problematic gradation crush from occurring even after undergoing the gradation correction.

Another object of the present invention is to provide an improved image processing scheme of properly extracting a background area from a color image data.

An image processing apparatus according to another aspect of the present invention includes:

a color range setting unit setting a color range for a background area of input color image data by using information on a background candidate area having a high possibility of belonging to the background area; and a background extracting unit extracting the background area from the input color image data by using the color range set by the color range setting unit.

Thereby, it is possible to extract the background area having equivalent chromaticness with high accuracy.

BRIEF DESCRIPTION OF DRAWINGS

Other objects and further features of the present invention will become more apparent from the following detailed description when read in conjunction with the accompanying drawings listed below.

DETAILED DESCRIPTION OF THE PREFERRED EMBODIMENTS

A first embodiment of the present invention will now be described.

Figure 1:
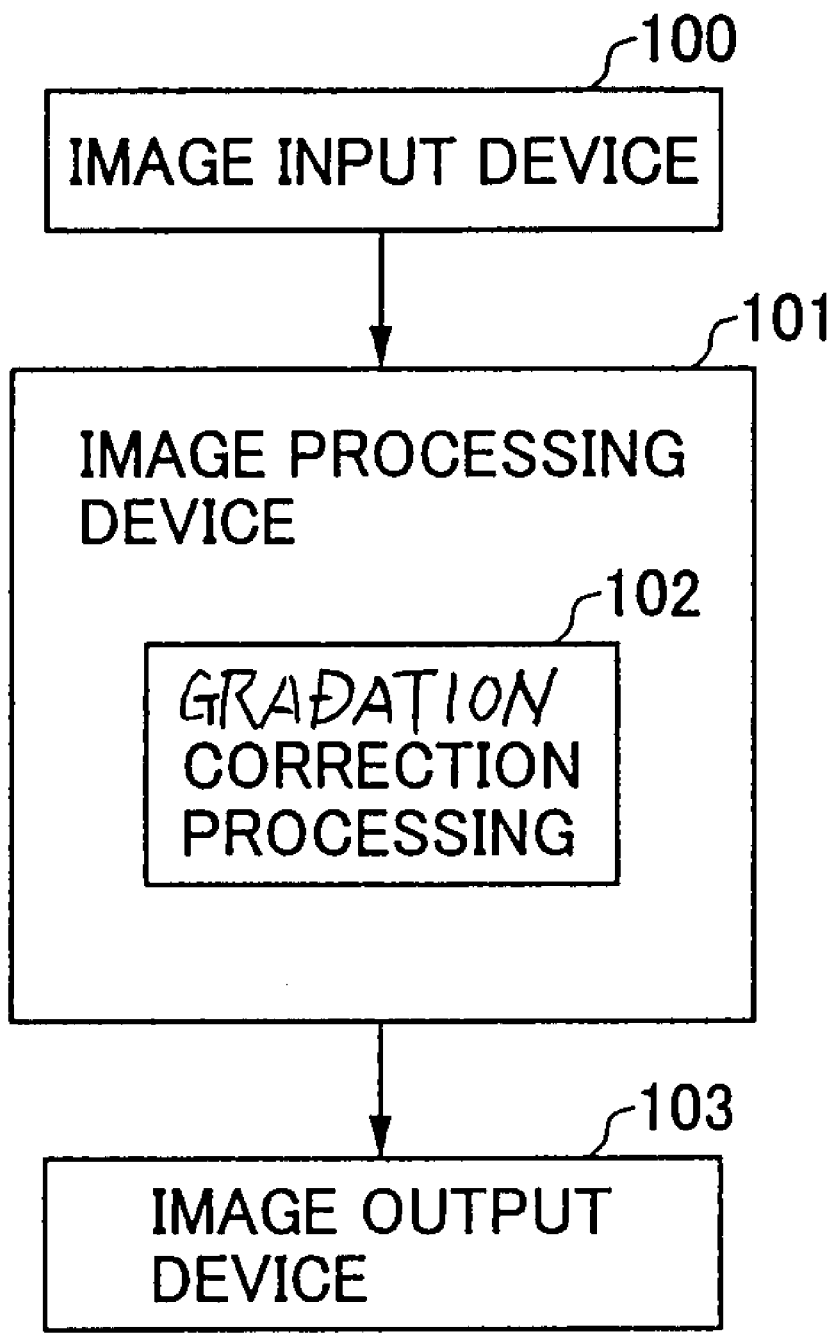
FIG. 1 shows an entire configuration of a first embodiment of the present invention.

FIG. 1 shows an entire view of the first embodiment. As show in FIG. 1, an image input device 100, such as a scanner, a digital camera or a video camera, outputs actually picked-up image data expressing a photograph etc. as a matrix of pixels to an image processing device 101. In a gradation correction processing part 102 in the image processing device 101, an optimum evaluation value is calculated and gradation correction processing is performed using the evaluation value. An image output unit 103, such as a display device or a printer, outputs the image data which has undergone the gradation correction processing. In a case of the first embodiment, as the image data, actually picked-up photo data, such as a photograph, is suitable. Moreover, according to this embodiment, the image data is color image data.

Figure 2:
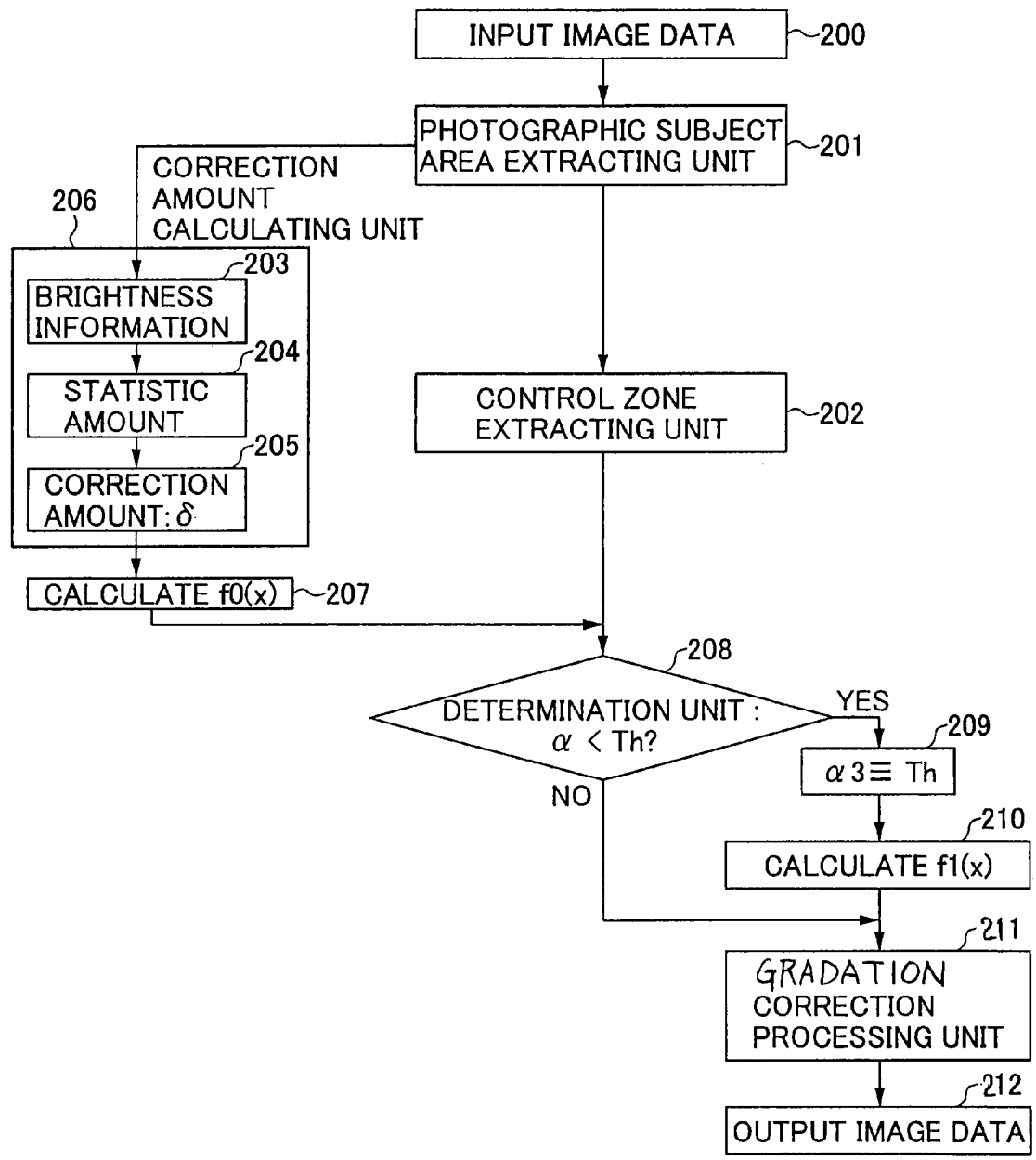
FIG. 2 shows a configuration of a gradation correction processing part shown in FIG. 1.

FIG. 2 shows a configuration of the gradation correction processing part 102 in this embodiment. First, the following processing are performed on image data 200 input through the image input device 100. Through a photographic subject area extraction unit 201, a main photographic subject area on the image data is extracted. There, extraction of photographic subject area may just use a well-known technology proposed in the prior art.

Next, through a control zone extraction unit 202, a control zone is determined from a brightness zone other than a brightness zone to which the photographic subject area belongs with respect to the brightness distribution on the whole image data. Hereafter, the input image to undergo the correction in this embodiment assumes to be of a backlight image, and, luminance is used as brightness information.

Figure 3:
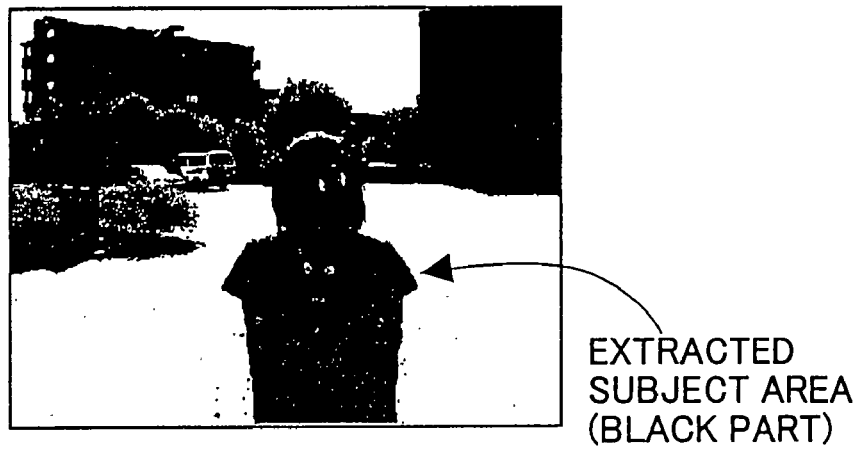
FIG. 3 illustrates a subject area extracted by a subject area extracting unit shown in FIG. 2 from a backlight image.
Figure 4:
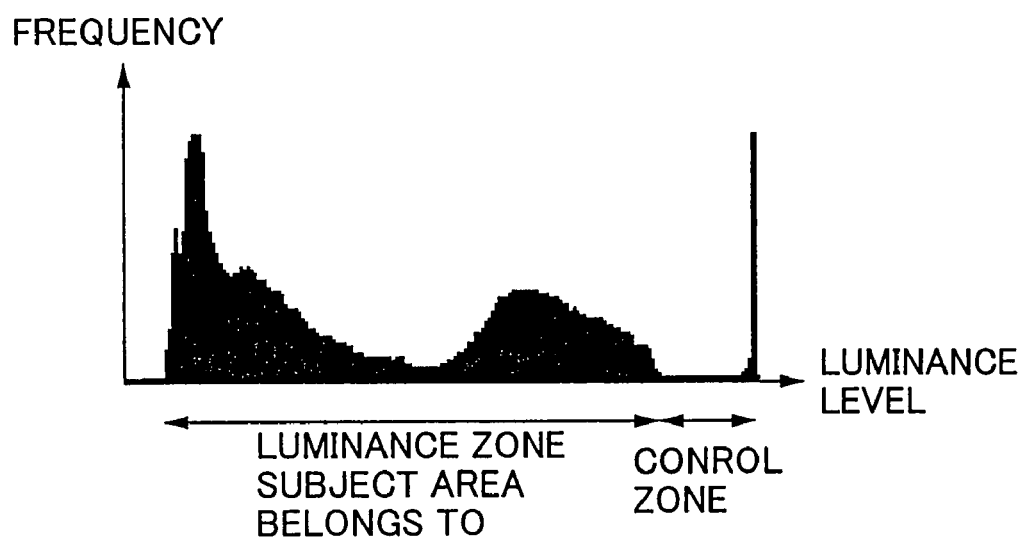
FIG. 4 shows a histogram on a luminance zone of the subject area and a control zone.

In a case of a backlight image, a photographic subject is dark with respect to the background and underexposure may occur. Therefore, the control zone is brighter than a luminance zone to which the photographic subject area belongs. FIG. 3 shows the photographic subject area of a backlight image extracted by the photographic subject area extraction unit. FIG. 4 shows a histogram of the luminance zone to which the photographic subject area belongs, and the control zone.

Next, processing for obtaining a gradation correction curve $f0(x)$ is described with reference to FIGS. 5 through 8. In order to simplify the description, it is assumed that the luminance minimum value 'sh' of input image data is such that sh=0, and the maximum 'hl' is such that hl=255.

A correction amount calculating unit 206 calculates a statistic 204 such as a median (median A is used as the statistic) from the luminance distribution 203 of the extracted main photographic subject area, and thus, obtains representative brightness of the main photographic subject.

Figure 5:
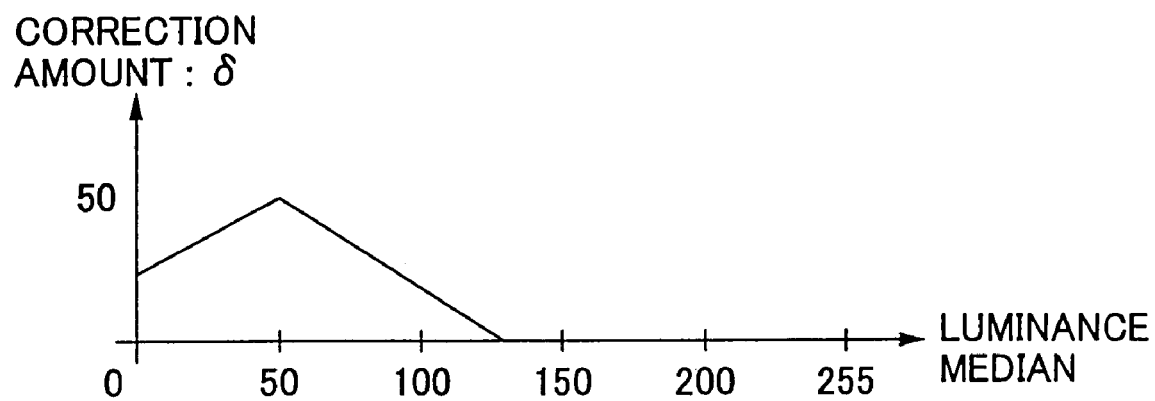
FIG. 5 shows a correction amount δ as a function with respect to the median.

Then, the correction amount calculating unit 206 determines based on the median A whether or not the brightness on the photographic subject is an appropriate one. When it is not an appropriate one, a temporary correction value δ 205 is obtained. Since underexposure due to the backlight state is assumed, δ>0, and, δ is defined as shown in FIG. 5, for example, as a function of the luminance median.

Next, gradation correction curve $f0(x)$ is calculated. In the case of δ=0, $f0(x)$=x.

Figure 6:
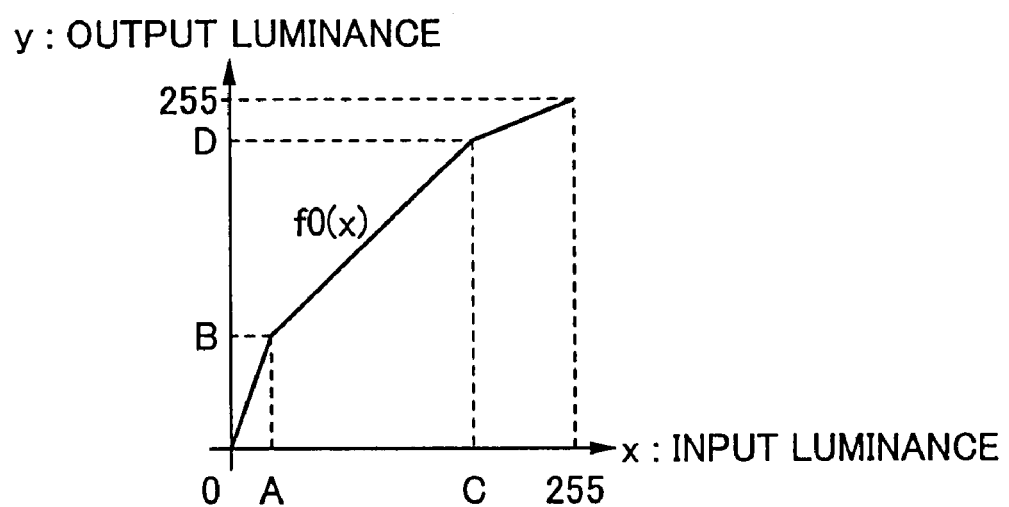
FIG. 6 shows a gradation correction curve in one example calculated according to the first embodiment of the present invention.

The case of δ≠0 will now be described. In this case, the gradation correction curve $f0(x)$ is shown in FIG. 6, and, thus, it is expressed by a combination of three linear functions and these respective functions $l1(x)$, $l2(x)$, and $l3(x)$ are calculated as follows for every luminance zone temporarily:

$$y = f0(x) = \quad (1)$$
$$l1(x) = \alpha1 \cdot x (0 \leq x < A)$$
$$l2(x) = \alpha2 \cdot x + \beta2 (A \leq x < C)$$
$$l3(x) = \alpha3 \cdot x + \beta3 (C \leq 255)$$

where:

-continued
$$\alpha1 = \{(A+\delta)/A\} \quad (2)$$
$$\alpha2 = 1, \beta2 = \delta(A \leq x < C),$$
$$\alpha3 = \{(255 - C - \delta)/(255 - C)\}, \beta3 = \{(255 \cdot \delta)/(255 - C)\}$$

In the calculation 207 of $f0(x)$, the functions are calculated temporarily in the order of $l1(x)$, $l2(x)$, and $l3(x)$ according to the correction amount δ.

Specifically, for the range of the input luminance value from the shadow point (0, 0) through the median A, the function $l1(x)$ is such that the coordinate points (0, 0) and (A, B) are connected by a straight line, where B=A+δ. For a range up to the maximum value C of the luminance zone of the main photographic subject area, the function $l2(x)$ has the inclination of 1. For a further highlight range, the function $l3(x)$ connects between the coordinate points (C, D) and (255, 255). Thus, the gradation correction curve shown in FIG. 6 is obtained.

Subsequently, in a determination unit 208, it is determined whether the correction amount δ on the control zone is suitable. In the gradation correction curve $f0(x)$ calculated from the correction amount δ, if the inclination α3 of $l3(x)$ is too small, gradation crush may occur in the highlight zone after the gradation correction. Therefore, the lower limit is provided for α3 by a threshold Th. Then, in case α3<Th, α3 is corrected such that α3≡Th(209). After that, instead of $f0(x)$ calculated by the gradation correction curve calculating unit 207, a new gradation correction curve $f1(x)$ is then calculated (210).

That is, the new gradation correction curve $f1(x)$ is also expressed by a combination of three linear functions, i.e. the respective functions $l1(x)$, $l2(x)$, and $l3(x)$, calculated temporarily in the order of $l3(x)$, $l2(x)$, and $l1(x)$ in this case.

As $l3(x)$ is the function having the inclination Th and passing through the coordinates (255, 255), $$\alpha3 = Th, \text{ and } \beta3 = 255(1 - Th) \quad (3)$$

At this time, the output C' (see FIG. 8) on the input C can be calculated using the formula (3), and thus $$C' = Th \cdot C + 255(1 - Th).$$

Since $l2(x)$ is the function with the inclination 1 and passing through the coordinates (C, C'), $$\alpha2 = 1, \text{ and } \beta2 = (255 - C)(1 - Th) \quad (4)$$

At this time, the output A' (see FIG. 8) on the input A can be calculated using the formula (4), and $$A' = A + (255 - C)(1 - Th).$$

Since $l1(x)$ passes through the coordinates (A, A') and (0, 0), $$\alpha1 = \{A + (255 - C)(1 - Th)\}/A \quad (5)$$

Thereby, the new gradation correction curve $f1(x)$ is calculated.

Consequently, as a result of determination by the determination unit 208, in the case of α3≧Th, $f0(x)$ calculated in the gradation correction curve calculation part 207 is used as it is, while, the new gradation correction curve $f1(x)$ is used in the case α3<Th. The above-described gradation correction processing is performed in the gradation correction processing unit 211.

Gradation correction processing performed on RGB color image data by using f0(x) as the gradation correction curve according to the first embodiment of the present invention will now be described.

On an input luminance value of image data Yin(j) (j=1, 2, and . . . , N, where N denotes the number of pixels on the input data), an output luminance value Y1(j) after undergoing the correction by the gradation correction curve f0(x) is defined. There, x denotes the input luminance value of image data.

The input luminance value is calculated by the following formulas. The luminance Yin(j) of the j-th pixel (j=1, 2, . . . N−1, N) can be expressed by the following formula using a color image signal (Rin(j), Gin(j), Bin(j)):

$$Yin(j) = 0.299 \cdot Rin(j) + 0.587 \cdot Gin(j) + 0.114 \cdot Bin(j) \quad (6)$$

The output luminance value Y1(j) after undergoing the gradation correction processing is calculated on the input luminance value Yin(j), and the gradation correction coefficient C0(j) is calculated by the following formula:

$$C0(j) = Y1(j)/Yin(j) \quad (7)$$
$$= f0(Yin(j))/Yin(j)$$

The input color image signal (Rin(j), Gin(j), Bin(j)) is converted by the following formula, and gradation corrected color signals (R1(j), G1(j), B1(j)) are thus obtained.

$$(R1(j), G1(j), B1(j)) = C0(j) \cdot (Rin(j), Gin(j), Bin(j)) \quad (8)$$

Moreover, when the input image signal is of gray, the gray level Yin(j) is regarded as an input value, and an output after undergoing the gradation correction processing should be obtained as the following output gray level.

$$Y1(j) = f0(Yin(j))$$

In addition, in usual image processing, when the reproducible range from 0 through 255 of the output device (the display device in this embodiment) is exceeded, clipping operation is performed. That is, any value less than zero is replaced by 0 while any value more than 255 is replaced by 255.

The above-described gradation correction processing is performed through the gradation correction processing unit 211, and thus, the corrected output image data 212 is obtained.

Figure 7:
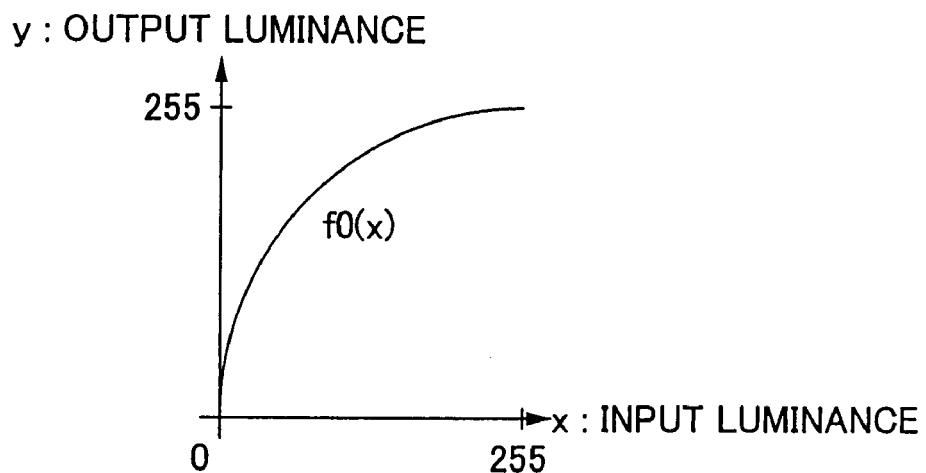
FIG. 7 shows a gradation correction curve in another example calculated according to the first embodiment of the present invention.
Figure 8:
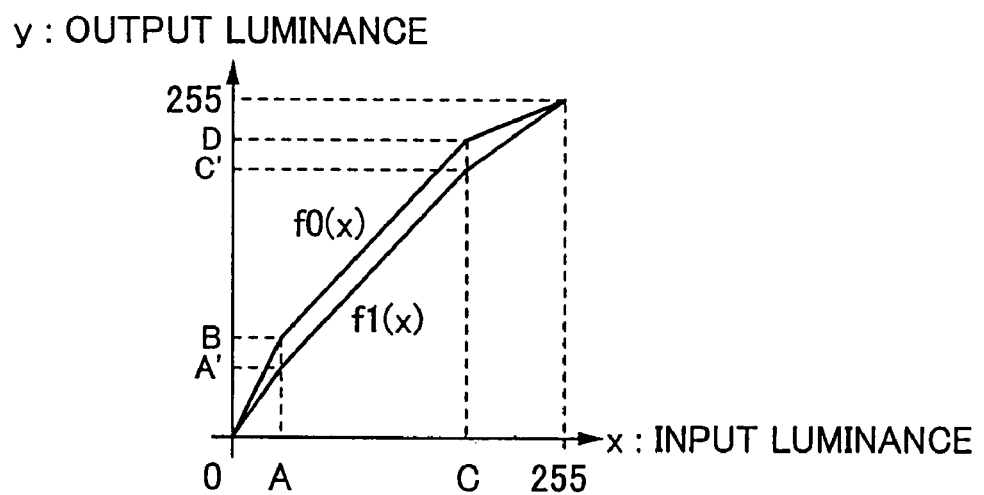
FIG. 8 shows original and updated gradation correction curves calculated according to the first embodiment of the present invention.

A case where the gradation correction curve is expressed by an exponential function f0(x) as shown in FIG. 7 will now be described. First, a statistic, such as a median, is calculated from the luminance distribution of the extracted main photographic subject area, and thus, the representative brightness of the main photographic subjects is obtained.

Next, with the thus-obtained median A, it is determined whether or not the photographic subject's brightness is appropriate, and, in a case where it is not appropriate, the correction amount δ is obtained. In addition, since underexposure due to a backlight state is assumed, 1>δ>0. Next, the gradation correction curve f0(x) is obtained as follows:

$$Y = f0(x) = x^\delta \cdot 255 \quad (9)$$

Next, the inclination on the tangent of f0(x) at x=C, for example, or a primary differentiation coefficient thereof is calculated as follows:

$$d(f0(x))/dx(x=c) = \lim(\delta \to 0)\{(f0(C+\delta) - f0(C))/\delta\} \quad (10)$$
$$= \delta \cdot C^{(\delta-1)} \cdot 255$$

Then, it is examined whether or not this value is equal to or more than the threshold Th. When it exceeds the threshold Th, the right-hand side of the formula (10) is determined as Th, and the final correction amount Δ is obtained. That is, Δ satisfying the following formula (11) is determined as the new correction amount:

$$\Delta \cdot C^{(\Delta-1)} \cdot 255 = th \quad (11)$$

The above-described embodiment is an example for avoiding excessive correction on highlight in case an image of backlight is corrected. However, the same control method may also be applied to a case of shadow part of image. That is, for the purpose of controlling occurrence of noise which otherwise occurs due to the gradation correction processing, the upper limit should be provided for α1, while, for the purpose of avoiding crush of gradation, the lower limit should be provided for α1.

Moreover, in this embodiment, threshold Th is changed according to the scene of an image. The scene means a state when the image is originally picked up by a camera, and the scene may be, for example, a flash (stroboscope) photography state at night, an underexposure state, a backlight state, etc. In a case an input image is one picked up in a state of backlight, a photographic subject is located in a low luminance side, and background may have been shifted into white zone. Accordingly, gradation crush on the background may not be remarkable. On the other hand, in flash (stroboscope) photography at night, a photographic subject is located in a highlight side, and, thus, grey scale reproducibility should be improved. Accordingly, the control conditions on backlight photography and night flash photography image are set to Thb and Thf, respectively, and, they should be determined such that:

Thb<Thf

Information on the above-mentioned scene is previously included in image data which may be obtained by utilizing tag information such as photography scene information included in given image data according to a file format standard for a digital still camera in case the given image data is provided from a digital camera as the input device. In this connection, see *Exchangeable image file format for digital still cameras: Exif Version 2.2*, as a Standard of Japan Electronics and Information Technology Industries Association. Especially, on page 59 thereof, there is a mention of setting as to whether or not photography is made at night, for example.

Further, in this embodiment, the threshold Th is changed according to the color reproducibility of the output apparatus. For example, generally speaking, when the output image apparatus is a monitor, gradation reproducibility is satisfactory, and when it is a printer, the gradation reproducibility at highlight or shadow is especially unsatisfactory. Accordingly, the control conditions for a monitor and a printer are set as Thm and Thp, respectively, and they should be determined such that:

Thm<Thp

In addition, although the above-mentioned embodiment employs the luminance, it is also possible to employ other information, for example, L value of L*a*b color expression system, G value of RGB or the like. As the method of extracting a photographic subject, various methods have been proposed in the prior art, and any one thereof may be appropriately employed. Further, as the statistic for obtaining δ, an average value or the like may also be employed instead of median mentioned above. Furthermore, the control conditions may be determined appropriately according to the output conditions applied.

A second embodiment of the present invention will now be described.

Figure 9:
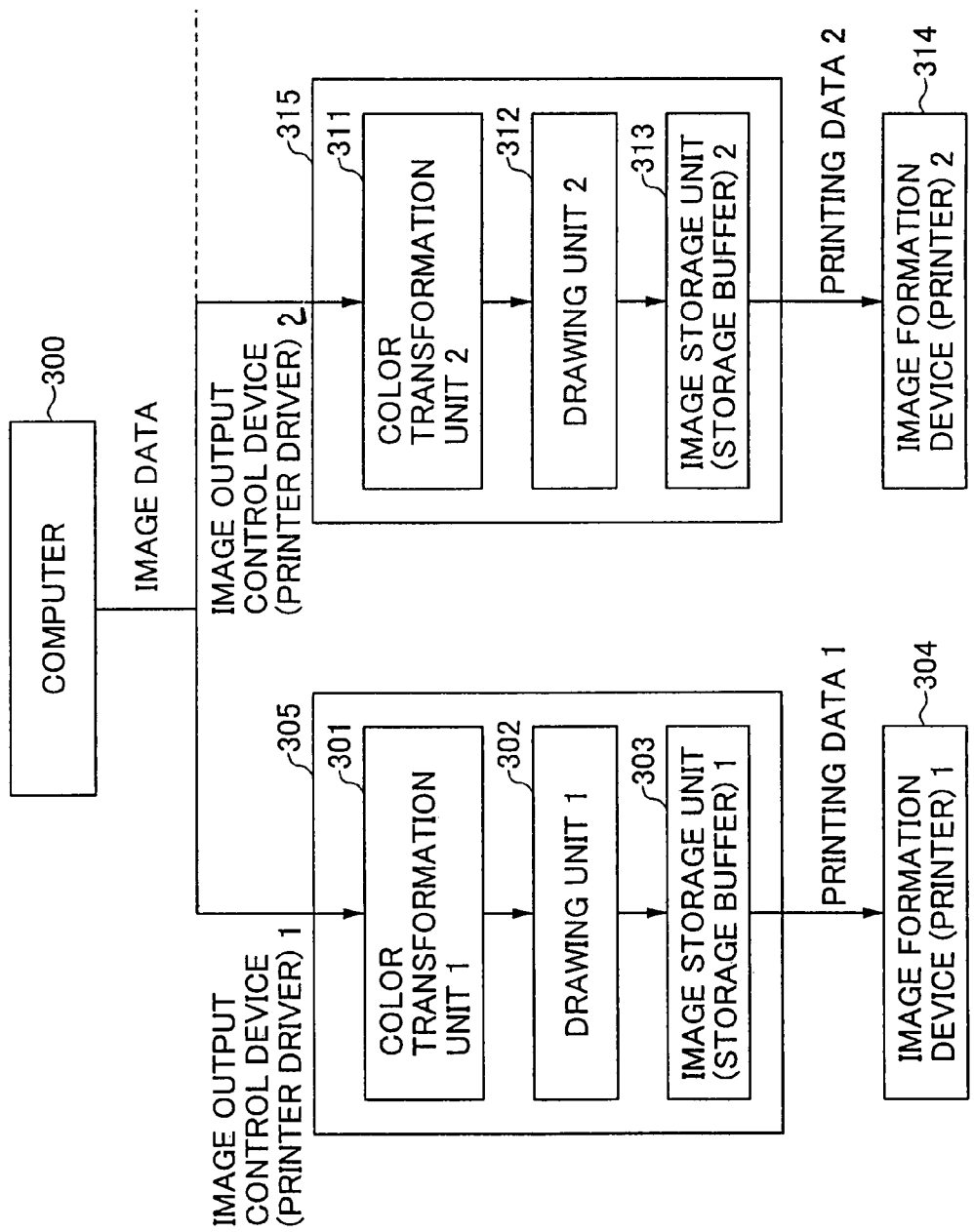
FIG. 9 shows a configuration of a second embodiment of the present invention.

The second embodiment applies the present invention to an image output system. FIG. 9 shows a configuration concerning the second embodiment. In FIG. 9, a computer 300 controls an image output control device. When an operator selects a printer (1) 304 and inputs output instructions to a computer, the computer 300 sends color and/or monochrome image data obtained through an image pickup device, image data of photograph or the like created by a various DTP software program, to an image output control device (1) 305.

The image output control device (1) 305 analyzes the thus-sent image data, performs color transformation processing described later into output color components C (Cyan), M (Magenta), Y (Yellow), and K (black) which are control signals on an image formation device such as a color copier, and transfers the result thereof to an image formation device which then prints out the transferred image data.

The image output control device (1) 305 includes a color transformation unit (1) 301 which performs, on the input image data, gradation correction processing and transformation into the control signals for the image formation device; a drawing unit (1) 302 which carries out gradation processing etc.; and an image memory/storage unit (storage buffer) (1) 303 which stores temporarily the printing image for every page drawn by the drawing unit (1) 302.

The above-mentioned image output control device may include a color transformation unit enabling printer output faithful to a display image, according to characteristics of the image display device and characteristics of the printer; and a resolution conversion unit controlling the resolution according to various types of image output units.

In addition, the image data input into the above-mentioned image output control device is, specifically, gradation data of RGB (green, blue, red), and the number of gradation levels on each color component is 8 bit=256 gradation levels, or, 64 or 512 gradation levels.

Operation of the image output control device (1) 305 will now be described. Image data is sent to the color transformation unit (1) 301, and gradation correction processing is performed in the color transformation unit (1) 301 according to the color reproducible range of the image formation device (printer) (1) 304. Next, color transformation is performed based on the characteristics of the image display device and the characteristics of the image formation device (printer) applied, and, thus, the input image data is changed into output color components C (Cyan), M (Magenta), and Y (Yellow) and K. (black) data which are the control signals for the image formation device (printer), which are sent to the drawing device and image memory device (storage buffer).

Figure 10:
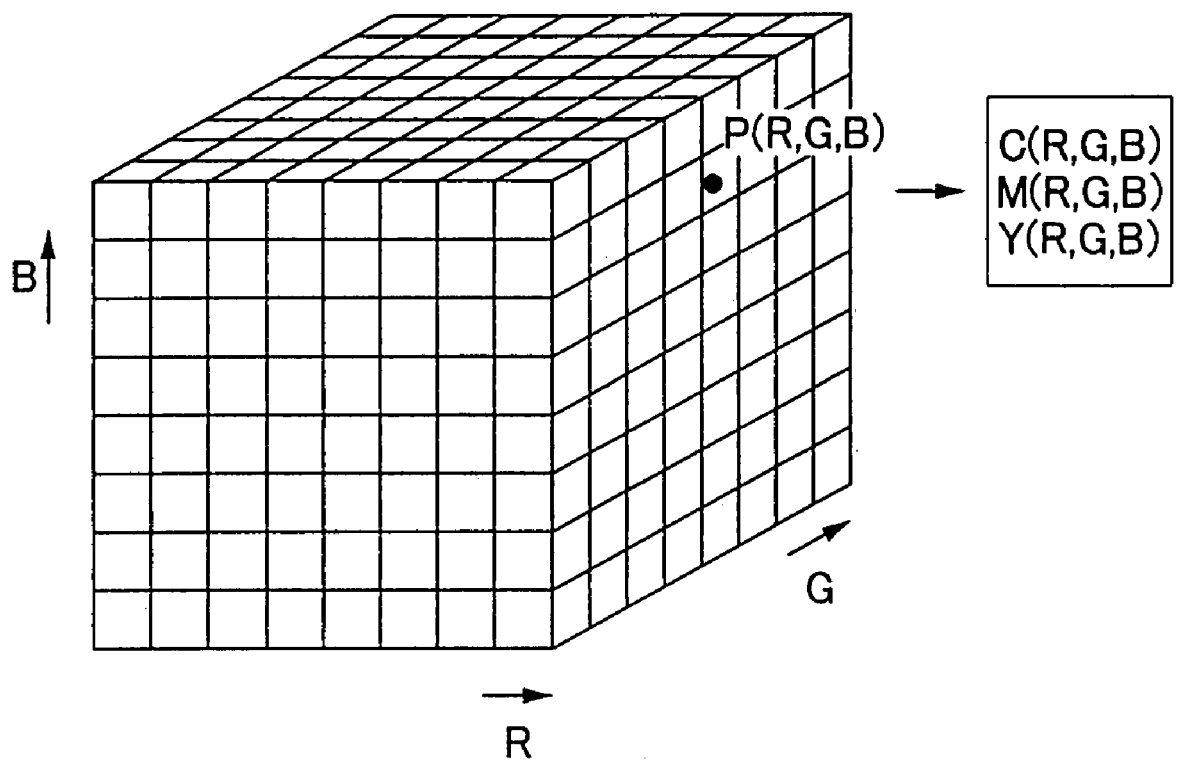
FIG. 10 illustrates a memory map interpolation scheme applicable to the second embodiment of the present invention.

Color transformation into the output color components C (Cyan), M (Magenta), Y (Yellow) and K (black) data from the RGB (green, blue, red) gradation data is carried out through memory map interpolation. That is, as shown in FIG. 10, assuming that the RGB space is regarded as the input color space, the RGB space is divided into similar solid figures such as cubes. Then, in order to obtain an output value P on input coordinate (RGB), a cubic including the input coordinate is selected, and linear interpolation is performed based on a relative position of the input coordinate with respect to vertexes of the cube (respective distances between the coordinate in the cube and vertexes). In this embodiment, the output values correspond to respective C, M, Y values, and, for the coordinate (RGB) in the input space, C, M, Y values are previously set on RGB (L*a*b*) calculated by least-squires method or the like by using data of actually measured input/output relationship (L*a*b*–CMY).

Furthermore, the CMY signal is converted into a CMYK signal by the following formulas:

$$K = \alpha \times \min(C, M, Y)$$

$$C' = C - \beta \times K$$

$$M' = M - \beta \times K$$

$$Y' = Y - \beta \times K$$

The color transformation method is not limited thereto. For example, the computer may store characteristics of the image display device in header information of the image data, and send out it. In case the above-mentioned image output control device is mounted into the computer, a device profile standardized by ICC (Inter Color Consortium) may be read out therefrom and used for this purpose.

Figure 11:
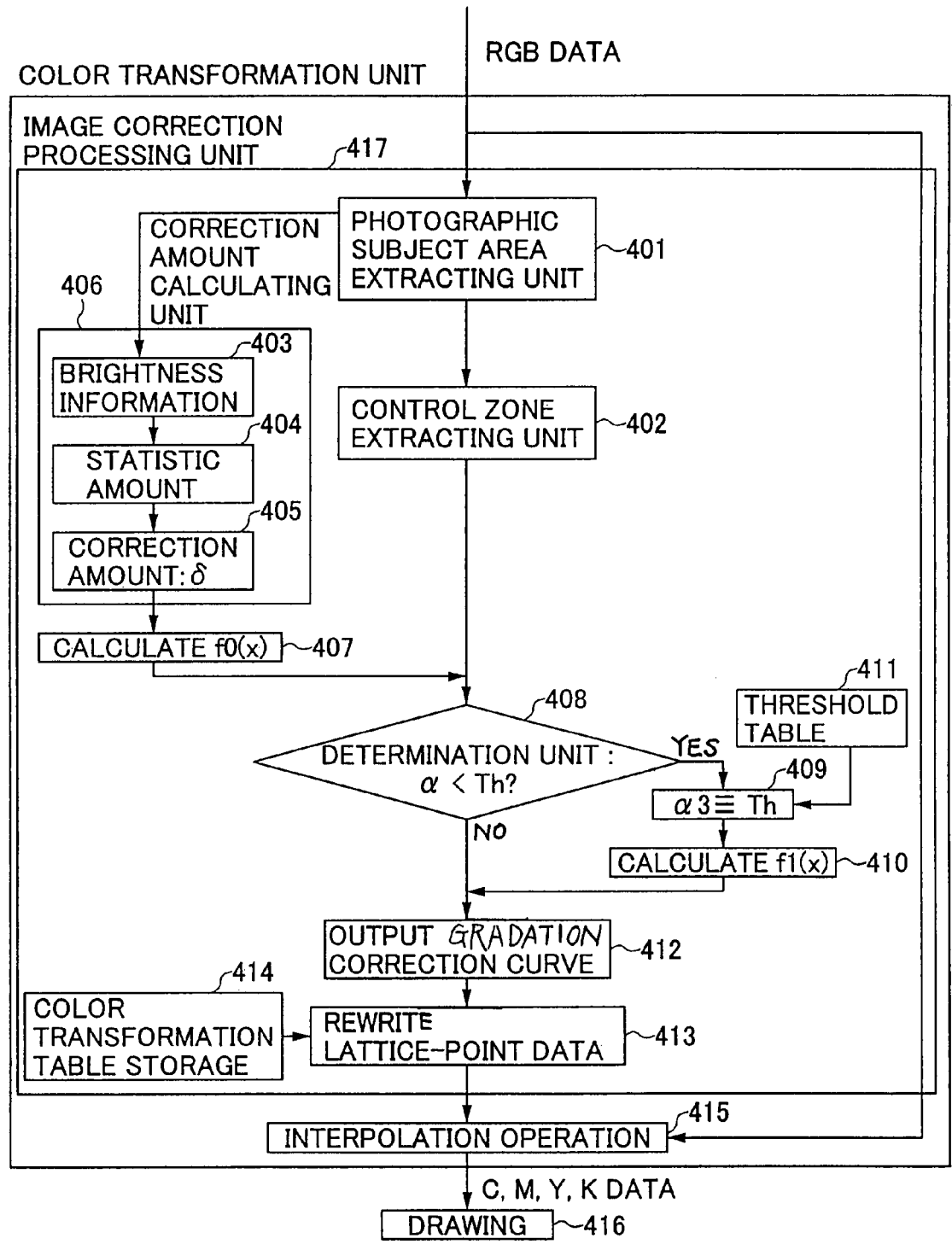
FIG. 11 shows a configuration of an image correction processing unit of a color transformation unit shown in FIG. 9.

The image correction processing unit 417 in the color transformation unit 301 will now be described with reference to FIG. 11. Since the image correction processing unit 417 is the same as that described above in the description of the first embodiment basically, duplicated description is omitted. However, according to the second embodiment, a threshold information table 411 is provided. Namely, since the reproducible range of each printer differs, the threshold also differs for every printer. Similarly, the threshold differs according to ink characteristics in the printer, and the gradation processing performed thereafter. Then, in the color transformation unit, the threshold information on the printers to be employed are provided in the table 411.

Lattice point data of the color transformation table memorized by the color transformation table memory part 414 is rewritten using the gradation correction curve calculated same as in the first embodiment (413). The transformation factor to CMYK is memorized on each lattice point on the RGB space. Gradation correction is not performed on the RGB value of each pixel of input image data, instead, the lattice point data is rewritten, and, thus, improvement in the speed of processing can be achieved.

Subsequently, the color transformation table rewritten is chosen from the color transformation table memory part for the input image data, and is sent to the interpolation operation part 415. In the interpolation operation part 415, with reference to the color transformation table, the above-mentioned memory map interpolation is performed for example, and the resulting image data is sent to the drawing unit 416.

The image output control device may be mounted in the inside of a color printer, and the color transformation may be carried out there. Alternatively, the same may be mounted in a computer. When it is mounted in a computer, the above-mentioned color transformation table includes all the information concerning the printers to which output may be made therefrom. Moreover, it is also possible that the same is mounted in a printer control device formed independently of the color printer, and after the color transformation is performed, the resulting image data is sent to the printer.

Furthermore, this embodiment may be embodied by a software program. In this case, it is possible that the same can be embodied by a printer driver prepared in a computer as one of application programs.

Figure 12:
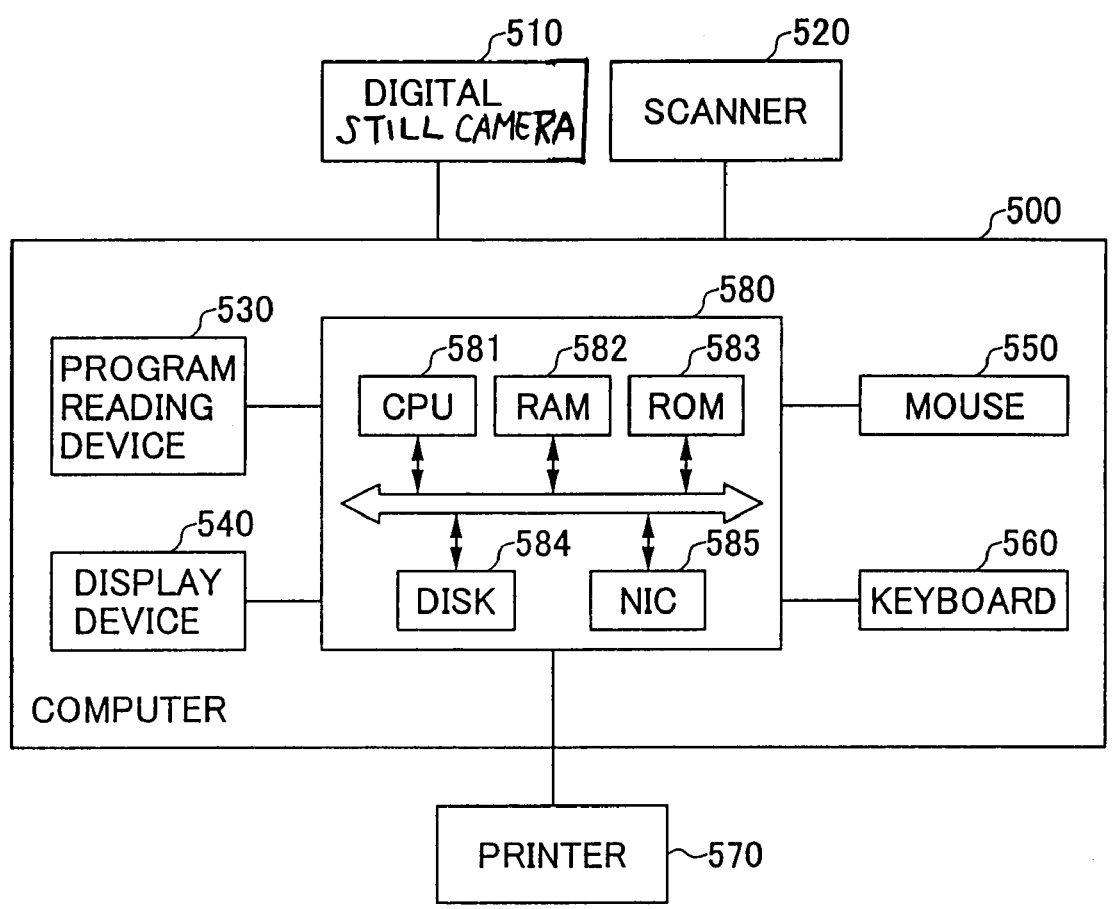
FIG. 12 shows a system configuration embodying the second embodiment of the present invention by means of a software program.

FIG. 12 shows an example of a system configuration in the case of carrying out this invention by a software program. According to this image output system, a printer 570 is connected with a workstation 500. The workstation 500 realizes the function of the gradation correction processing mentioned above, and includes a display device 540, a keyboard 560, a program reading device 530, an operation processing device 580, etc. In the operation processing device 580, a ROM 582 and a RAM 583 are connected to a CPU 581 by bus which can execute various instructions. Moreover, a disk 584 which is a mass storage device, and a NIC 585 which communicates with the apparatus on the network are connected to the bus.

The program reading device 530 is a device which reads program codes memorized by the memory medium which stores various kinds of program codes, i.e., a floppy disk, a hard disk, optical disc (CD-ROM, CDR, CD-R/W, DVD-ROM, DVD-RAM, etc.), a magneto-optical disc, a memory card, etc., for example, includes a floppy disk drive, an optical disk drive, an optical magnetism disk drive, etc.

The program codes memorized by the memory medium is read out by the program reading device, is then stored in the disk, etc., and then, realizes the imager processing method described above as a result of the program codes read out from the disk, etc. being executed by the CPU. Moreover, it is also possible that, by performing the program codes which the computer reads. out by the computer, based on instructions on the program codes, a part or all of the relevant processing is executed by an OS (operating system), a device driver, etc. which are working on the computer, and thereby the functions described above according to the present invention are realized.

Figure 13:
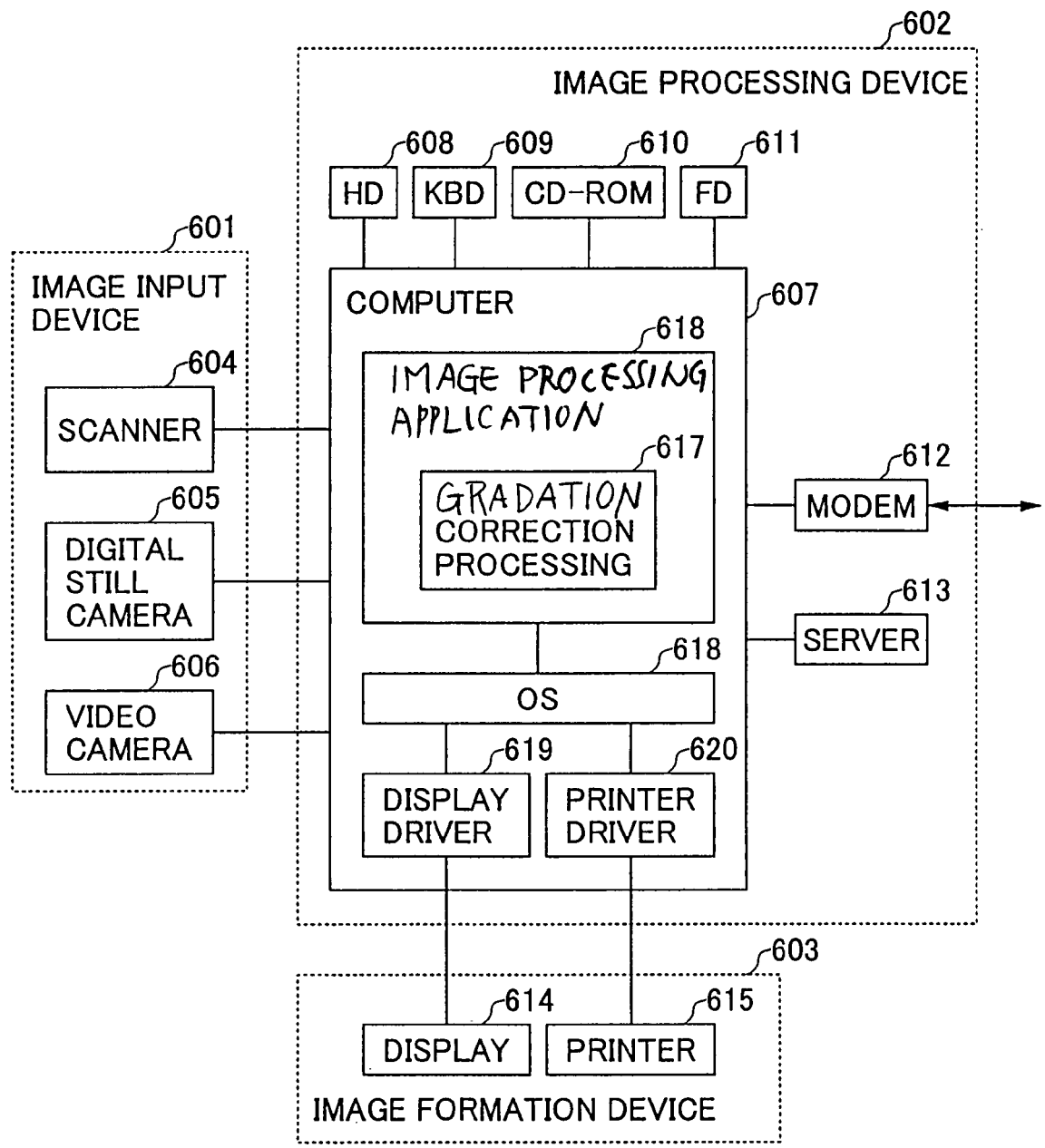
FIG. 13 shows a block diagram of a configuration of an image output apparatus in a third embodiment of the present invention.

A third embodiment of the present invention will now be described. FIG. 13 is a block diagram showing the configuration of an image output unit according to the present invention. As shown in the figure, the image output unit has an image input device 601, an image processing device 602, and an image formation device 603. The image input device 601 has a scanner 604, a digital still camera 605, or a video camera 606, and outputs image data of an actually picked up photo which expresses a color image, such as a photograph, as a matrix of pixels, to the image processing device 602.

The image processing device 602 includes a computer 607, a hard disk drive 608, a keyboard 609, a CD-ROM drive 610, a floppy disk drive 611, a modem 612, and a server 613. The image formation device 603 has a display device 614 and a printer 615. The computer 607 of image processing device 602 has an operation system 616, an image processing application 618 which has a gradation correction unit 617, and a display driver 619 and a printer driver 620. Execution of processing is controlled by the operating system 616, and the image processing application 618 cooperates with the display driver 619 if needed, and performs predetermined image processing.

When this image processing application 618 performs image processing, the gradation correction unit 617 creates gradation data of RGB by performing gradation correction processing using an optimum evaluation value on input gradation data of RGB, and, displays resulting image data on the display device 614 through the display driver 619, or outputs the same to the printer 615 through the printer driver 620.

Figure 14:
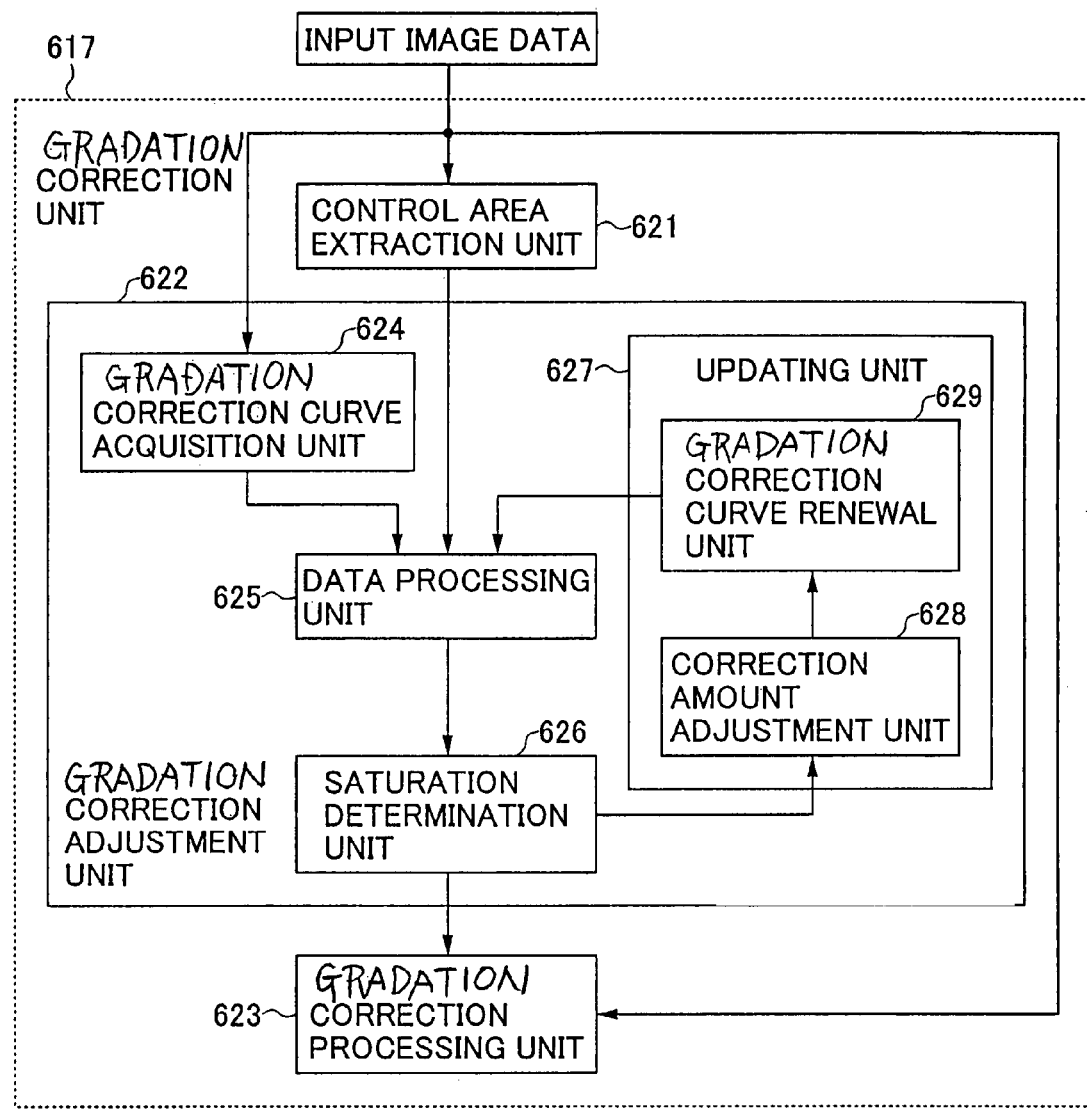
FIG. 14 shows a block diagram of a gradation correction unit shown in FIG. 13.

The gradation correction unit 617 has a control area extraction unit 621, a gradation correction adjustment unit 622, and a gradation correction processing unit 623, as shown in a block diagram of FIG. 14. The control area extraction unit 621 extracts a control area in which gradation crush tends to be conspicuous after gradation correction processing is performed on the input image data. The gradation correction adjustment unit 622 has a gradation correction curve acquisition unit 624, a data processing unit 625, a saturation determination unit 626, and an updating unit 627.

The gradation correction curve acquisition unit 624 acquires a gradation correction curve f0(x) from the input whole image data, or performs photographic subject extraction for a person area etc. from the given image, determines the correction amount from the median, etc. thereof, and obtains the gradation correction curve f0(x). There, x denotes the input luminance value of the image data. The data-processing unit 625 performs gradation correction processing on the image data in the control area extracted by the control area extraction unit 621 with the gradation correction curve. The saturation determination unit 626 evaluates gradation crush on the image data having undergone the gradation correction processing.

The updating unit 627 has a correction amount adjustment unit 628, and a gradation correction curve renewal unit 629, and when the gradation crush is so remarkable as not to be permitted by the saturation determination unit 626, the amount of gradation correction is adjusted by the correction amount adjustment unit 628, and thus, a new gradation correction curve fi(x) is obtained by the gradation correction curve renewal unit 629. There 'i' shows the number of times of updating of the gradation correction curve. The renewal of this gradation correction curve fi(x) is repeated until it is determined that the gradation crush becomes so small as to be permitted by the saturation determination unit 626. The gradation correction processing unit 623 performs gradation correction processing by using the gradation correction curve, for which it is determined that the gradation crush is permitted by the saturation determination unit 626, on the input image data.

Figure 15:
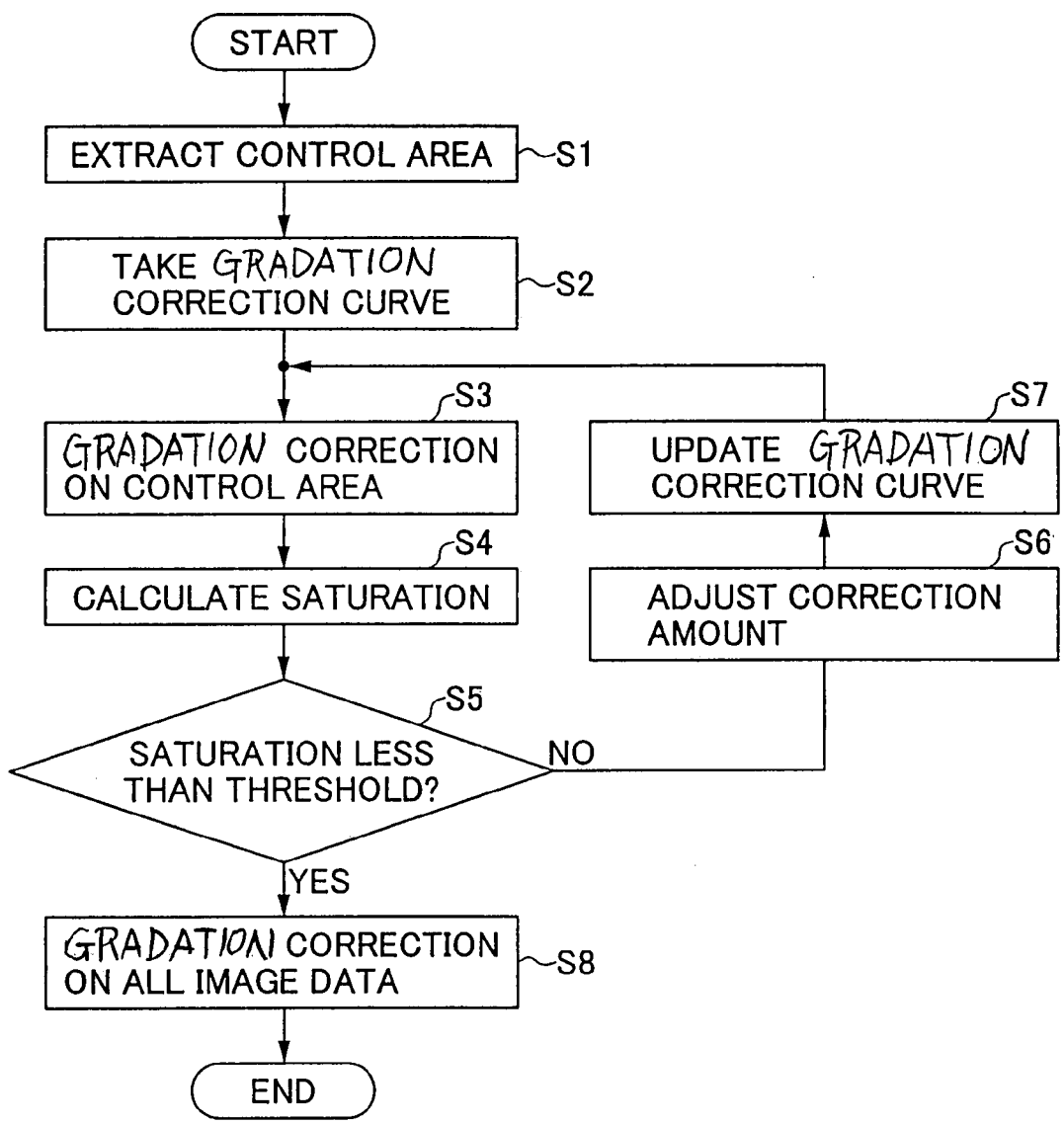
FIG. 15 shows a flow chart of gradation correction processing according to the third embodiment of the present invention.

The processing for performing gradation correction on the color image data of RGB input from the image input device 601 through the gradation correction unit 617 configured as described above will now be described with reference to the flow chart shown in FIG. 15.

When the input image data is sent to the gradation correction unit 617, the control area extraction unit 621 first extracts the control area on which gradation crush becomes conspicuous after the gradation correction processing is performed on the image data. Then, the control area extraction unit 621 sends the image data on the thus-extracted control area to the gradation correction adjustment unit 622 in a in a step S1.

The gradation correction curve acquisition unit 624 of the gradation correction adjustment unit 622 acquires the gradation correction curve f0(x) from the thus-input image data (in a step S2). Gradation correction processing of the image data in the control area extracted by the control area extraction unit 621 is performed by the data-processing unit 625 by using thus-acquired gradation correction curve f0(x) (in a in a step S3). The gradation correction processing of the color image data of RGB using this gradation correction curve f0(x) will now be described in detail.

The number of pixels on the input image data is referred to as j=(1, 2, ..., N−1, N), the input luminance of the image data is defined as Yin(j), the output luminance value after undergoing the correction with the gradation correction curve f0(x) is defined as Y1(j). The input luminance value Yin(j) of the j-th pixel of the input image data can be expressed by the following formula (12) using the color image signal (Rin(j), Gin(j), Bin(j):

$$Y\text{in}(j)=0.299 \cdot R\text{in}(j)+0.587 \cdot G\text{in}(j)+0.114 \cdot B\text{in}(j) \qquad (12)$$

The output luminance value Y1(j) after undergoing the gradation correction processing with the gradation correction curve f0(x) is calculated on this input luminance value Yin(j), and the gradation correction coefficient CO(j) is calculated by following formula (13):

$$CO(j)=Y1(j)/Yin(j)=f0(Yin(j))/Yin(j) \quad (13)$$

By converting the input color image signal (Rin(j), Gin(j), Bin(j)) by the following formula (14) using this gradation correction coefficient CO(j), the gradation corrected color signal (R1(j), G1(j), B1(j)) is acquired:

$$(R1(j), G1(j), B1(j))=CO(j)\cdot(Rin(j), Gin(j), Bin(j)) \quad (14)$$

When the input image signal is of gray, the gray level Yin(j) is regarded as the input value, and the output after undergoing the gradation correction processing should be obtained as the output gray level Y1(j)=f0(Yin(j)).

In ordinary image processing, when the reproducible range from 0 through 255 of the output device of the display device 614 is exceeded, for example, clipping is performed. That is, for a value less than zero value is converted into zero, and for a value more 255 is converted into 255. On the other hand, according to the third embodiment of the present invention, clipping is not performed until a final gradation correction curve is obtained and gradation correction processing is performed therewith.

By using this gradation correction curve f0(x), the degree of saturation on image data obtained after the gradation correction processing is performed on the RGB color image data is calculated, and, by using the thus-obtained saturation degree, gradation crush is evaluated in a steps S4 and S5. For example, when at least one of the color components having undergone the gradation correction on the j-th pixel (R1(j), G1(j), B1(j)) exceeds the range from 0 through 255 which is the reproducible range of the display device 614, it is considered that the j-th pixel is saturated. Then, by determining, by using the thus-obtained saturation information, whether or not there is any gradation crush, and determination is made as to whether or not the gradation crush, if any, is permitted.

The saturation degree for evaluating the gradation crush is calculated by the following method. For example, an average excessive value is calculated on the pixels regarded as exceeding the reproducible range of the display device 614 and thus being saturated. That is, the maximum level Lj (j=1, 2, ..., K) of the color component saturated is obtained for every pixel of K saturation pixels, and, as shown in following formula (15), an average value Oave of the differences between the respective maximum levels Lj and the upper limit 255 of the reproducible range is calculated as the degree of saturation.

$$Oave=\Sigma(Lj-255)/K \quad (15)$$

where $\Sigma$ is performed for j=1, 2, ..., K.

It is also possible, for example, for M pixels which belong to the control area, K/M is defined as the degree of saturation, or K/N may be defined as the degree of saturation with respect to N pixels belonging to all the area of the relevant image.

The saturation determination unit 626 determines that the saturation degree, i.e., gradation crush is so large as to be not permitted, when the calculated degree of saturation is more than a predetermined threshold Th1. According to an experiment, this threshold Th1 should be such that Th1=0.03, when K/M is defined as the degree of saturation. It is possible to consider that the j-th pixel is saturated, in case the input image signal is of gray, when the gray level Y1(j) after gradation correction (j) exceeds the reproducible range of the display device 614.

Figure 16A:
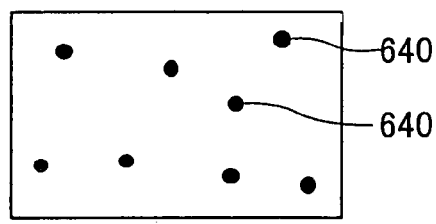
FIGS. 16A, 16B and 16C illustrate calculation of threshold for determining a saturation degree according to the third embodiment of the present invention.
Figure 16B:
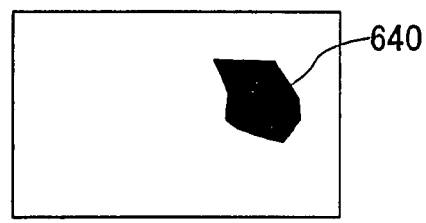

Whether or not the saturation degree is permitted depends on particular images. For example, the degree of conspicuousity differs even when the saturation degree calculated is same between an image shown in FIG. 16A where the saturation areas 640 are scattered and an image shown in FIG. 16B where the saturation area 640 is concentrated. Accordingly, permission criterion on the saturation degree also differs according to the scattering/distribution degree of the control area or the saturation area 640. Then, it is preferable to vary the threshold for determining whether to permit the saturation degree, according to the distribution/scattering degree of the saturation pixels.

Figure 16C:
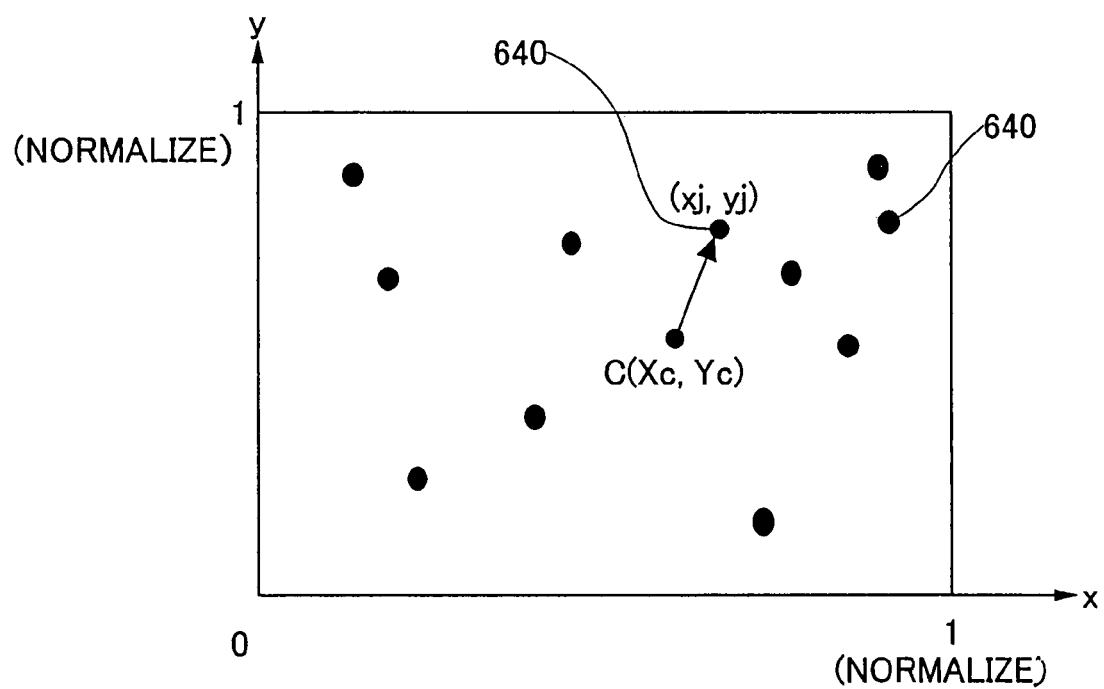

That is, numbering is made on the pixels belonging to the saturation areas, the center-of-gravity position thereof is calculated, the average distance between the center-of-gravity position and the respective saturation pixels is calculated, the distribution degree of the saturation areas is determined using the thus-calculated value, and, thus, the threshold may be varied according to the thus-obtained distribution degree. Specifically, as shown in FIG. 16C, the width and height of a relevant image are normalized into "1", and, then, on the numbered K saturation pixels, the center-of-gravity position C (Xc, Yc) is calculated by the following formula (16):

$$Xc=(\Sigma xj)/K$$

$$Yc=(\Sigma yj)/K \quad (16)$$

Then, the average distance Rave between thus-calculated center-of-gravity position C (Xc, Yc) and the respective saturation pixels 640 is calculated by the following formula (17):

$$Rave=[\Sigma\{(xj-Xc)^2+(yj-Yc)^2\}^{(1/2)}]/K \quad (17)$$

where, in the formulas (16) and (17) formulas, $\Sigma$ is performed for j=1, 2, ... K.

When this average distance Rave (<1) is large, this means that the saturation pixels 640 are scattered and the saturation degree is not conspicuous for a viewer. Then, the threshold Th1 for determining the allowance range according to the calculated average distance Rave is made into a variable threshold Th1(Rave) by following formula (18):

$$Th1(Rave)=Rave\cdot\alpha+\beta \quad (18)$$

where $\alpha$ and $\beta$ denote positive natural numbers.

The calculation method for this distribution degree may use not only the above described method but another specimen variance scheme, etc. Moreover, image data picked up with a digital camera 605, etc. has a high possibility that a central area of the image has a photographic subject, and the importance on the central area is high. Then, the threshold may be weighted according to the center-of-gravity position of saturation pixels. For example, as the center-of-gravity position is closer to the central area of a given image, the threshold may be made to be lowered, since it is expected that saturation is conspicuous for a viewer as the position becomes closer to the center of the image.

Figure 17:
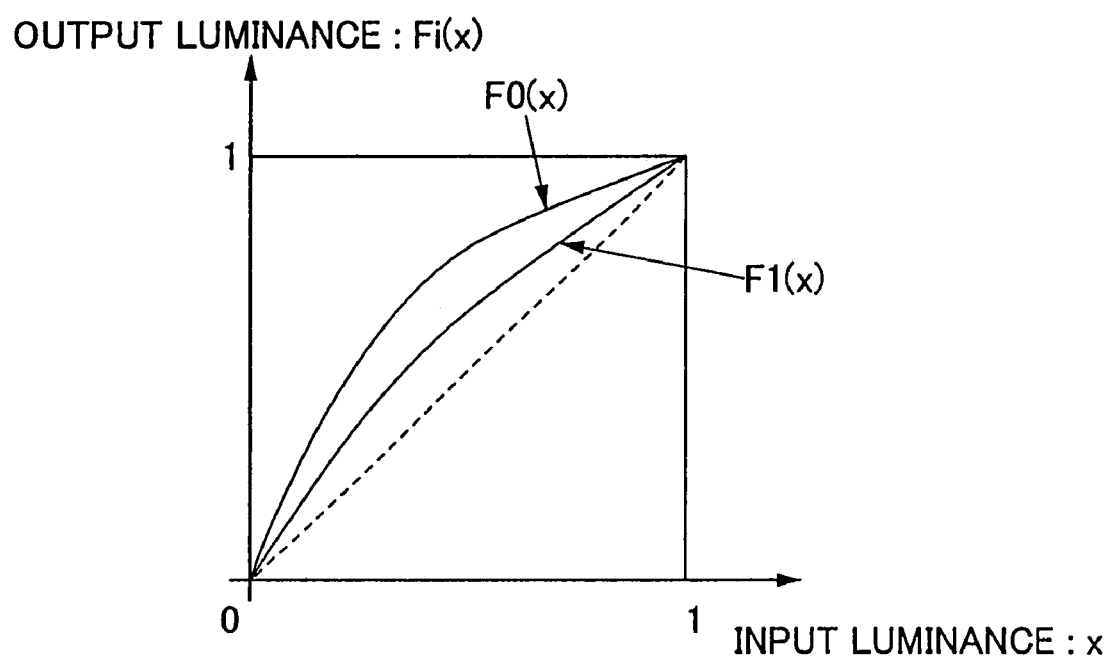
FIG. 17 illustrates updating of gradation correction curve according to the third embodiment of the present invention.

When it is determined that the gradation crush is such as not to be permitted as a result of the evaluation on the saturation degree by this saturation determination unit 626, the amount of gradation correction is adjusted by the correction amount adjustment unit 628 of the updating unit 627 (in a step S6), and a new gradation correction curve f1(x) is obtained by the of gradation correction curve renewal unit 629 by using this adjustment result (in a step S7). For example, it is assumed that the gradation correction curve f0(x) is defined by the following formula (19) where x denotes the luminance value of the input signal, as shown in FIG. 17:

$$f0(x)=255\cdot F0(x)$$

$$F0(x)=x^\gamma \quad (19)$$

where γ=0.4

Then, in order to perform the adjustment and updating of the gradation correction curve f0(x) and to obtain the new gradation correction curve f1(x), the value of γ is stepped up by 0.1 from 0.4 to 0.5, and thus, $$f1(x)=255 \cdot F1(x)$$

$$F1(x)=x^\gamma \quad (20)$$

where γ=0.5

Thus, the new gradation correction curve f1(x) shown by (20) is obtained (also see FIG. 17). However, there are various scheme of adjusting the gradation correction curve, and, for example, when fi(x) is expressed by a straight line, changing the inclination thereof may be applied for the same purpose.

The data-processing unit 625 carries out gradation correction processing on the image data in the control area extracted by the control area extraction unit 621 (In a step S3) by using this new gradation correction curve f1(x), and gradation crush in the image data after the gradation correction processing is evaluated by the saturation determination unit 626 (in a step S4). Until it is determined that gradation crush becomes not so remarkable as to be permitted, the renewal of the gradation correction curve, temporary gradation correction processing on the image data in the control area and evaluation on the gradation crush thereof are repeated.

When it is determined that the gradation crush occurring is not so remarkable as to be able to be permitted, the gradation correction curve fi(x) at that time is output to the gradation correction processing unit 623, and the gradation correction processing unit 623 performs gradation correction processing on the color image for all the image data by using the thus-sent gradation correction curve fi(x) (in a in a step S8).

Next, the processing for extracting the control area in which gradation crush becomes conspicuous when gradation correction processing is performed on the input image data, by the control area extraction unit 621 will now be described.

Figure 18A:
FIGS. 18A, 18B and 18C illustrate control candidate area extracting processing according to the third embodiment of the present invention.
Figure 19A:
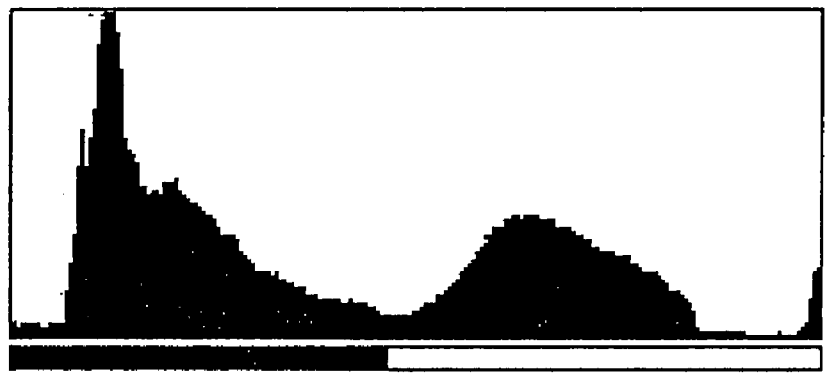
FIGS. 19A and 19B show luminance histograms illustrating the control area extracting processing according to the third embodiment of the present invention.

The control area extraction unit 621 classifies into two or more classes, for example, four classes, the brightness, for example, the luminance level, of the input image data, and defines an area which is likely to be saturated due to gradation correction as a candidate for the control area, i.e., a control candidate area. For example, a luminance histogram which expresses the luminance level along the horizontal axis and expresses the occurrence frequency of pixels along the vertical axis as shown in FIG. 19A on a luminance image 641 (see FIG. 18A) in a backlight scene is created. This histogram is divided into four zones, according to the luminance value, and, then, new luminance levels are provided with new frequency distribution H(i) where i=0, 1, 2, and 3, as follows:

a level 0 with the frequency H(0) for the original luminance level in the range between 1 and 63;

a level 1 with the frequency H(1) for the original luminance level in the range between 64 and 127;

a level 2 with the frequency H(2) for the original luminance level in the range between 128 and 191; and a level 3 with the frequency H(3) for the original luminance level in the range between 192 and 255.

Figure 18B:
Figure 18C:
Figure 19B:
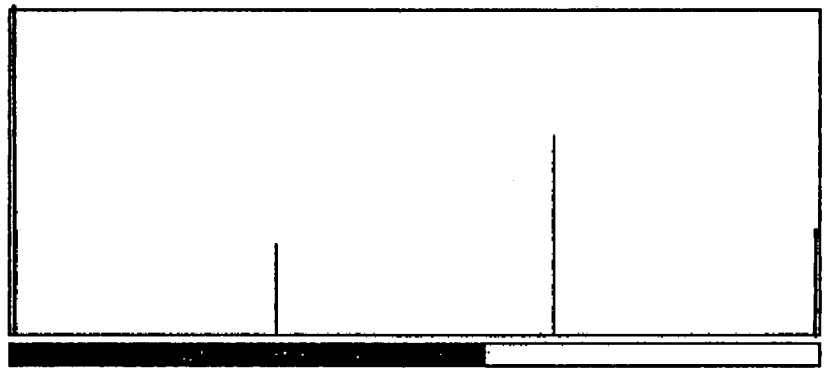

The luminance histogram after the classification into these four zones is shown in FIG. 19B, and the luminance image 641 after the classification is shown in FIG. 18B. As shown in FIG. 18B, the luminance image 642 after the classification is thus posterized, and thereby, the contrast of the image is made clearer. Then, when the zone belonging to the level 3 which is the brightest area after the classification, for example, is defined as the control candidate area, the control candidate area where the whited-out portion of the image 643 shown in FIG. 18C is extracted. Thus, the luminance is used as information for the brightness information there. However, it is also possible to use as brightness information, a G signal, or the like for the same purpose. Further, the classification may be performed after contrast adjustment is performed on the frequency distribution.

It is preferable to determine the control area which is left after removing areas on which it is expected that gradation crush is not conspicuous even after gradation correction is performed from this control candidate area. For example, in a case of backlight image picked up with a background of a light source, through a digital camera, a colorless area exists as a background with high luminance. Since there is a little difference in gradation there, and thus, such an area is not conspicuous after gradation correction processing is performed thereon, even when saturation takes place there, it may thus be removed beforehand.

Such high luminance and colorless pixels are expressed by the following formulas:

$$Rin(j) < Th2 \text{ and } Gin(j) < Th2 \text{ and } Bin(j) < Th2; \text{ and}$$

$$|Rin(j) - Gin(j)| < Th3; \text{ and}$$

$$|Gin(j) - Bin(j)| < Th3; \text{ and}$$

$$|Bin(j) - Rin(j)| < Th3 \quad (21)$$

where Rin(j), Gin(j) and Bin(j) denote values on respective color components of the relevant pixel, and Th2 and Th3 denote thresholds.

The above-mentioned thresholds should be such that Th2=220 and Th3=20 according to the result of an experiment. However, these thresholds Th2 and Th3 may have other values. Moreover, in case of the input image signal is of gray, areas in which it has a little level difference in gradation and has high luminance, and, thus, it is predicted that gradation crush is not conspicuous as a result of gradation correction processing should be removed previously.

Moreover, since, generally speaking, data of image picked up through a digital camera undergoes edge emphasis processing in an image output system in the camera, pixels near edges are emphasized and a whited-out phenomenon etc. may occur there. Thus, these areas should be previously removed in order to prevent these areas from being erroneously determined as those causing the saturation. In order to detect edge areas, the following method may be applied.

Figure 20:
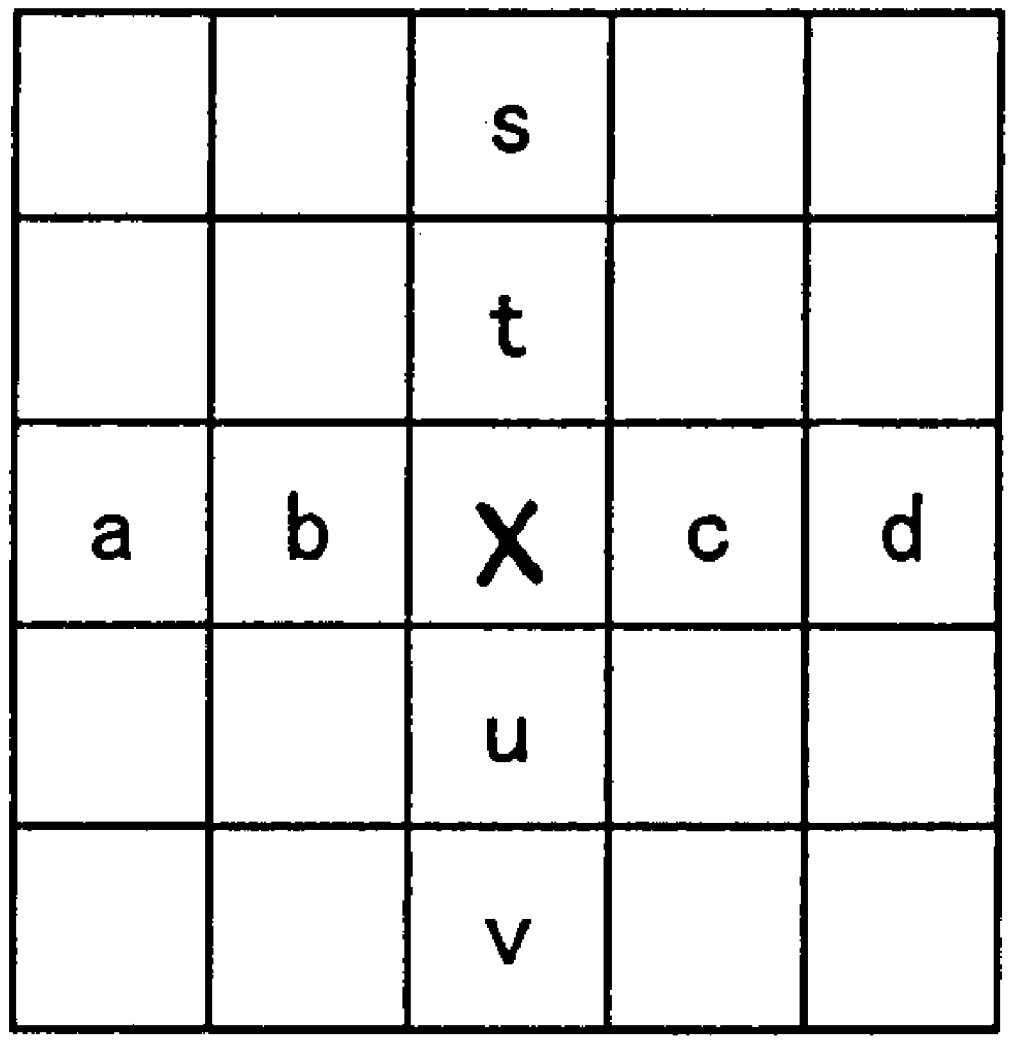
FIG. 20 shows a luminance distribution illustrating edge extracting processing according to the third embodiment of the present invention.

As shown in FIG. 20, the pixel luminance value on a relevant pixel is assumed as X. The pixel luminance values on four pixels in the vicinity in the horizontal direction are assumed as a, b, c, and d, respectively. Similarly, the pixel luminance values on four pixels in the vicinity in the vertical direction are assumed as s, t, u and v, respectively. In order to extract an edge, sums of differences in high-frequency band and a middle-frequency band are calculated in the horizontal direction and vertical direction, as follows:

horizontal high-frequency band: $Lhh(X)=|X-c|+|X-b|$ horizontal middle-frequency band: $Lhm(X)=|X-a|+|X-d|$ vertical high-frequency band: $Lvh(X)=|X-t|+|X-u|$ horizontal middle-frequency band: $Lvm(X)=|X-s|+|X-v|$ \quad (12)

In the formula (22), sums of differences of the relevant pixel and peripheral two pixels thereof in vertical or horizontal directions are obtained. That is, when the value on the relevant pixel differs from the peripheral pixels, the calculation value becomes larger. When the values on the peripheral pixels and the relevant pixel are equivalent, the calculation value becomes smaller conversely. Therefore, by calculating the sums of differences, the degree of isolation on the relevant pixel is examined, and, thus, a possibility that the relevant pixel forms an edge is examined. Evaluation values are calculated from the thus-obtained sums of differences, by the following formulas (23). The evaluation value on the horizontal direction is referred to as Eh(X) while the evaluation value on the vertical direction is referred to as Ev(X), and, the larger one thereof is referred to as the evaluation value E(X) on the relevant pixel.

$$Eh(X)=(Lhh(X)+Lhm(X))/2$$

$$Ev(X)=(Lvh(X)+Lvm(X))/2$$

$$E(X)=\max(Eh(X), Ev(X)) \quad (23)$$

Furthermore, in consideration of human visual nature that higher luminance causes noises or the like to be more likely to be sensed, a determination threshold Th4 for edge is changed according to luminance value X on the relevant pixel. According to the result of an experiment, this determination threshold Th4 should be determined as follows:

$$Th4(X)=100 \ (0 \leq X<50)$$

$$Th4(X)=-(3/5)X+130 \ (50 \leq X<200)$$

$$Th4(X)=10 \ (200 \leq X<255) \quad (24)$$

Then, in case the evaluation value is such that E(X)>Th4(X), the relevant pixel is determined as an edge portion or a portion having undergone edge emphasis processing, and is removed from the control areas. The threshold Th4(X) is not limited to that determined by the formulas (24). Moreover, other than the above-described method, other various methods may be considered for determining whether or not a relevant pixel belongs to an edge portion or a portion having undergone edge emphasis processing, and may be used instead. In case the input image signal is of gray, the value on gray level should be regarded as X, and determination should be made by using it as to whether or not a relevant pixel belongs to an edge portion.

In data of image pickup by a digital camera, a photographic subject has high chroma originally, and also, chroma emphasis processing is performed in an image output system in the camera, generally speaking. Since there is thus a little difference in gradation on the relevant area in such a case, saturation is not conspicuous even after undergoing gradation correction processing. Accordingly, it is preferable to previously remove such an area from candidate for the control area. For example, by utilizing the human visual nature that the signal level of G signal is near to the luminance sensed, evaluation is made as to whether or not a relevant pixel is of high chroma, by comparing the difference between the G component and the other color components with a threshold Th5, by the following formula (25):

$$|Rin (j)-Gin (j)|>Th5; \text{ and}$$

$$|Gin (j)-Bin (j)|>Th5 \quad (25)$$

where Rin(j), Gin(j) and Bin(j) denote color components of the relevant pixel, respectively. Then, when the requirement defined by the formula (25) is satisfied, the relevant pixel is regarded as one of high chroma and thus, is removed from control areas.

According to the result of an experiment, the threshold Th5 should be 100. However., another value may also be applied thereto. Furthermore, another method may also be used for determining whether or not a relevant pixel is of high chroma.

In case where it is thus determined that gradation crush cannot be permitted by the gradation correction adjustment unit 622 based on the image data on the control area extracted by the control area extraction unit 621, it is preferable to update the control area in addition to updating the gradation correction curve fi(x). Thereby, it is possible to improve the data processing speed. Such a case where the control area is also updated in addition to updating the gradation correction curve fi(x) by the gradation correction adjustment unit 622 will now be described.

Figure 21:
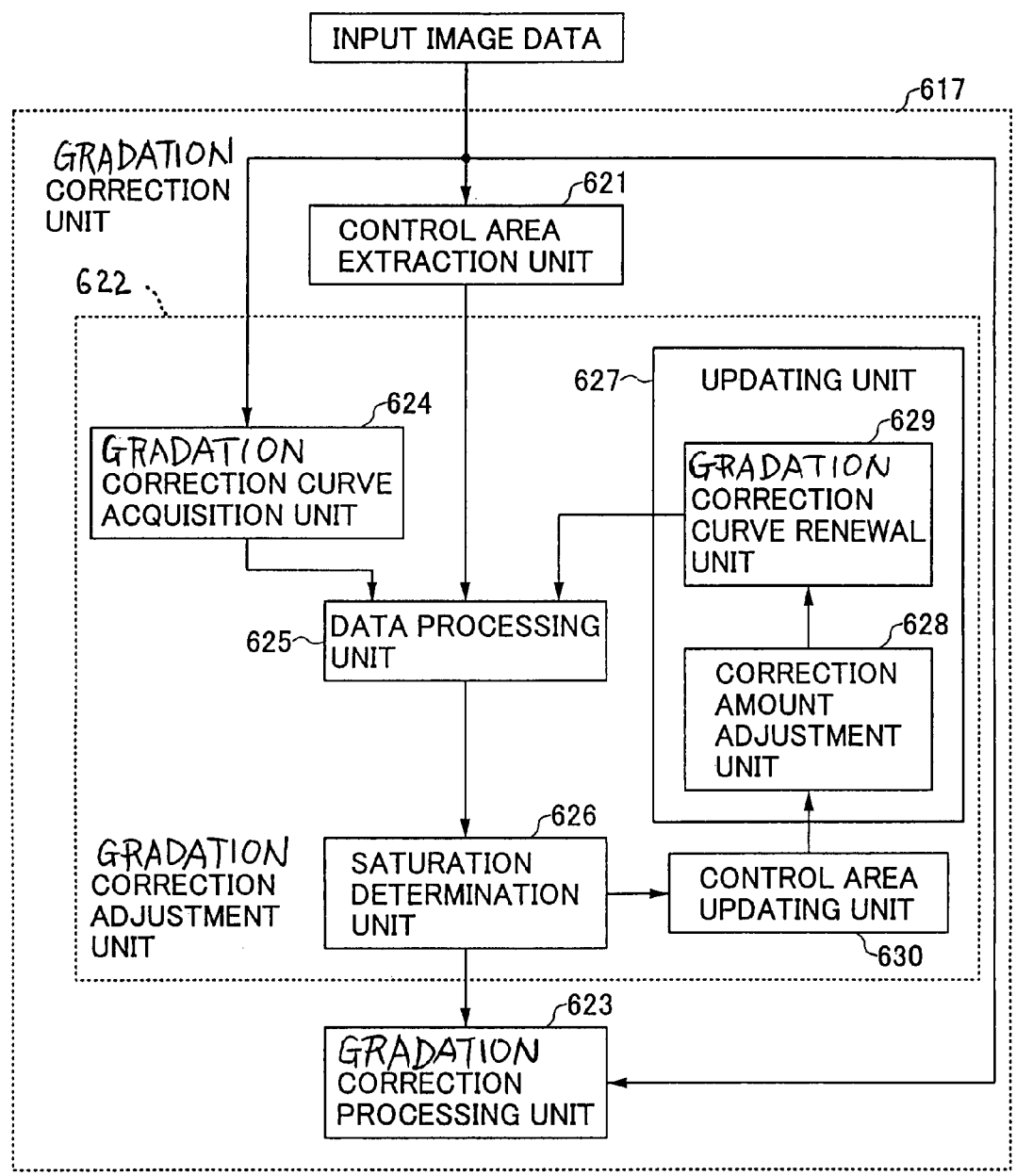
FIG. 21 shows a block diagram of a gradation correction unit having a control area updating unit according to the third embodiment of the present invention.

In this case, as shown in a block diagram of FIG. 21, the gradation correction adjustment unit 622 includes a control area updating unit 630 which updates the control area extracted by the control area extracting unit 621 when it is determined that gradation crush is not permitted as a result of evaluation on saturation degree by the saturation determination unit 626.

Figure 22A:
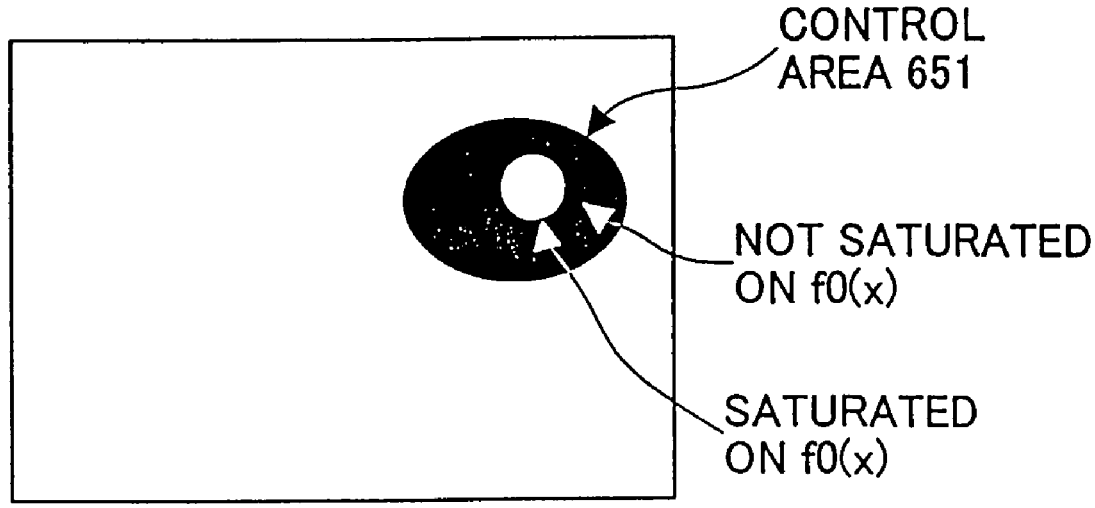
FIGS. 22A and 22B illustrate control area updating processing according to the third embodiment of the present invention.

Then, from input image data, the control area extraction unit 621 extracts a first control area 651 shown in FIG. 22A, gradation correction processing is then performed on the image data of this control area 651 by using the gradation correction curve f0(x) obtained by the gradation correction curve acquisition unit 624, and then, first saturation degree evaluation is performed on the image data thus having undergone the gradation correction processing, by the saturation determination unit 626.

Figure 22B:
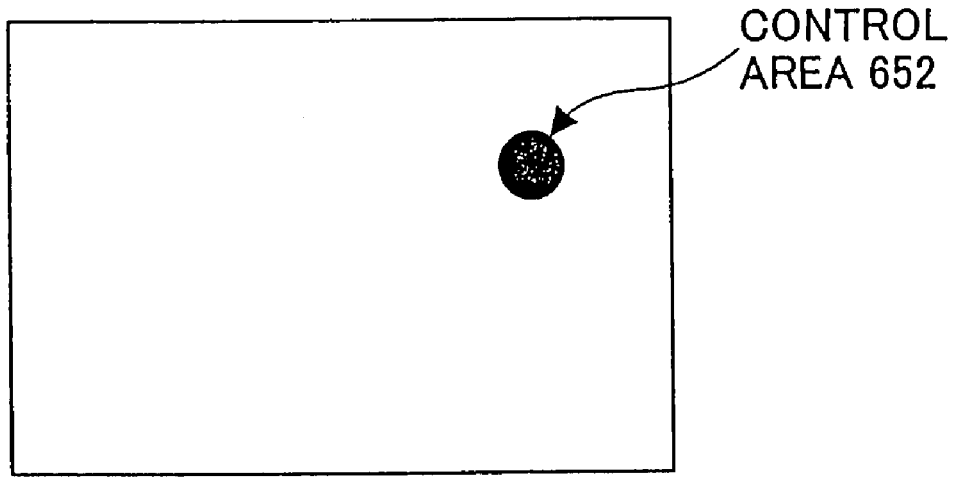

Then, when the gradation crush is determined as not to be permitted according to the evaluation result of this first evaluation, the control area updating unit 630 obtains a second control area 652 shown in FIG. 22B, based on the result of the above-mentioned first saturation degree evaluation performed on the first control area 651. The second control area 652 belongs to the first control area 651 but does not include pixels thereof which do not cause saturation at the gradation correction processing by using the gradation correction curve f0(x).

This is because, gradation correction processing performed by using a renewed gradation correction curve f1(x) is obtained through adjustment by the renewal unit 627 such that saturation is not more likely to occur thereby than in the case of using the original gradation correction curve f0(x). Accordingly, the area which did not cause saturation at the processing by using the original gradation correction curve f0(x) should not cause saturation, and thus, should not undergo saturation determination from the subsequent occasion.

Then, the amount of correction is adjusted by the correction amount adjustment unit 628, and the new gradation correction curve f1(x) is obtained by the gradation correction curve renewal unit 629. Gradation correction processing is then performed on the image data of the second control area 652 using this gradation correction curve f1(x). Whether or not the gradation crush resulting from the gradation correction processing is permitted by the saturation determination unit 626 is determined. Then, as a result, when the gradation crush is permitted, further renewal of the gradation correction curve fi(x) is not performed, but outputs the gradation correction curve f1(x), and performs gradation correction processing on all image data through the gradation correction processing unit 623.

Figure 23:
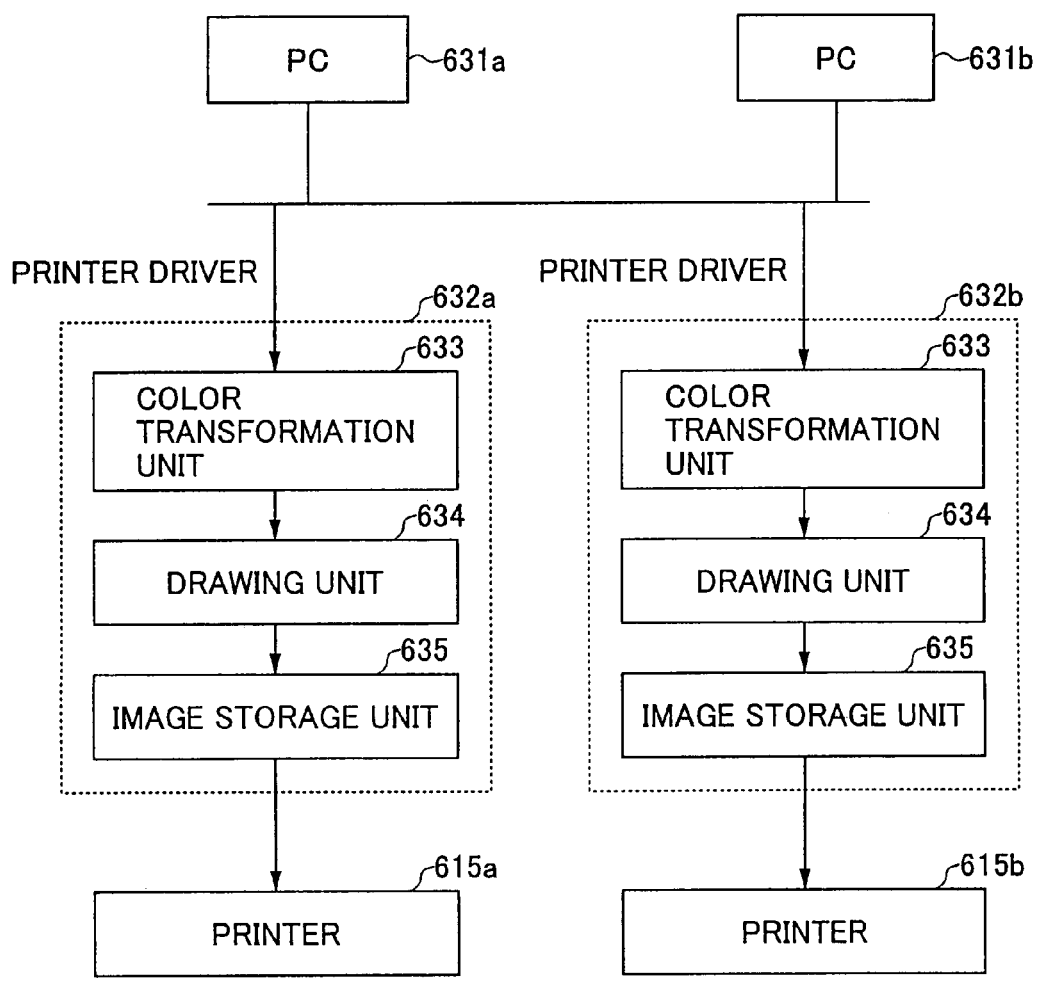
FIG. 23 shows a block diagram of an image output system according to the third embodiment of the present invention.
Figure 24:
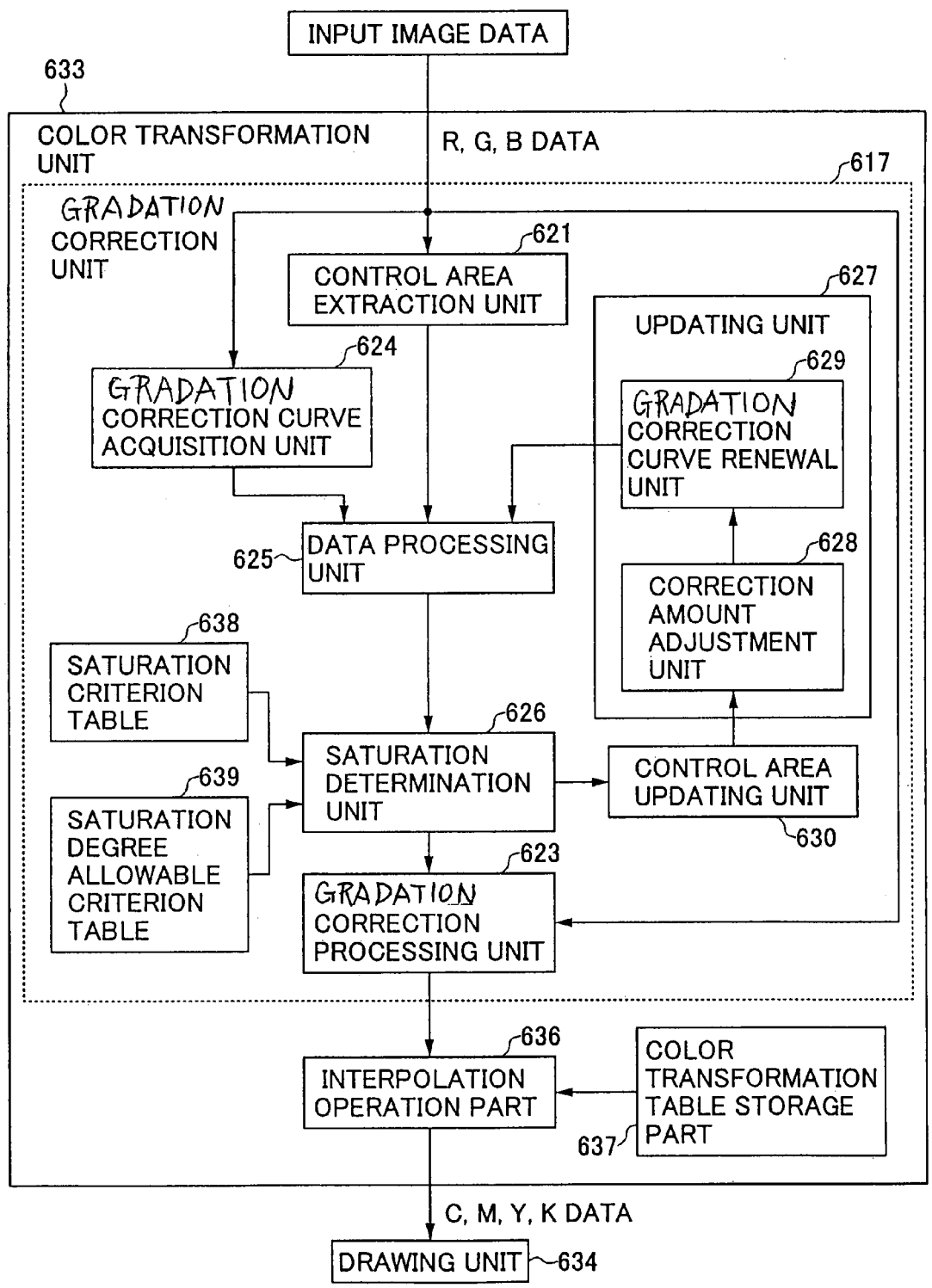
FIG. 24 shows a block diagram of a color transformation unit of a printer driver shown in FIG. 23.

An image output system which has an image output control device (printer driver) which has the above-mentioned gradation correction unit 617 will now be described. The image output system includes a plurality of personal computers (PC) 631a and 631b, and printers 615a and 615b connected with these personal computers through printer drivers 632a and 632b, respectively, as shown in a block diagram of FIG. 23. The printer drivers 632a and 632b have color transformation units 633, drawing units 634 performing gradation processing and so forth, and image memory units 635 storing temporarily printing image for every page drawn by the drawing units 634. The color transformation unit 633 has the gradation correction unit 617, an interpolation operation part 636, and a color transformation table memory part 637, as shown in a block diagram of FIG. 24.

In this image output system, when an operator chooses the printer 615a via the personal computer 631a and output instructions are input thereto, the personal computer 631a sends image data created from an image taken by a digital camera or the like, or created through various DTP software, such as a photograph of both monochrome and color, to the printer driver 632a. After the printer driver 632a performs gradation correction processing on the thus-sent image data, it performs color transformation processing for a plurality of output color components C (cyan), M (magenta), Y (yellow), and K (black), and sends the thus-produced printing data to the printer 615a. The printer 615a prints out an image from the thus-sent printing data.

The gradation correction processing performed in the color transformation units 633 of the printer drivers 632a and 632b at a time of printing and outputting the image data and processing of transformation into the printing data of CMYB from the image data of RGB will now be described. When the image data of RGB is sent to the printer driver 632a from the personal computer 631a, the first control area 651 (see FIG. 22A) is extracted by the control area extraction unit 621 of the printer driver 632a, and the data-processing unit 625 performs gradation correction processing on the image data of this first control area 651 by using the gradation correction curve f0(x) acquired by the gradation correction curve acquisition unit 624.

Evaluation for the first saturation degree is performed by the saturation determination unit 626 on the data having thus undergone the gradation correction processing. Since the reproducible range of each printer 615a/615b differs, the criterion on the saturation also differs for every printer 615a/615b. Then, a saturation criterion table 638 is provided which stores the criterion information on the saturation concerning the relevant printer 615a in the gradation correction unit 617.

Moreover, the criterion on the saturation degree also differs according to gradation processing performed after that, and ink characteristics of each printer 615a/615b. For the purpose of involving these matter, a saturation degree permission table 639 which stores a allowance criterion information on the saturation degree concerning the relevant printer 615a is provided in the gradation correction unit 617. The saturation determination unit 626 reads the information stored in the saturation criterion table 638 and the saturation degree allowance criterion table 639 is read, and determines whether or not the current degree of gradation crush is permitted. When it is thus determined that the gradation crush is not permitted, the control area renewal unit 630 obtains the second control area 652 (see FIG. 22B) from the above-mentioned first control area 651 and also the evaluation result obtained on the current saturation degree.

Then, the amount of correction is adjusted by the correction amount adjustment unit 628, and the new gradation correction curve f1(x) is obtained by the gradation correction curve renewal means 629. The image data on the second control area 652 is made to undergo, according to the his gradation correction curve f1(x), the gradation correction processing, and, whether or not the gradation crush occurring thereby is permitted is determined by the saturation determination unit 626. Then, when the gradation crush is permitted, renewal of the gradation correction curve fi(x) is not performed again, but the current gradation correction curve f1(x) is output, and gradation correction processing is carried out on all the image data by the gradation correction processing unit 623 with the thus-obtained final gradation correction curve f1(x), and the result is output to the interpolation operation part 636.

Figure 25:
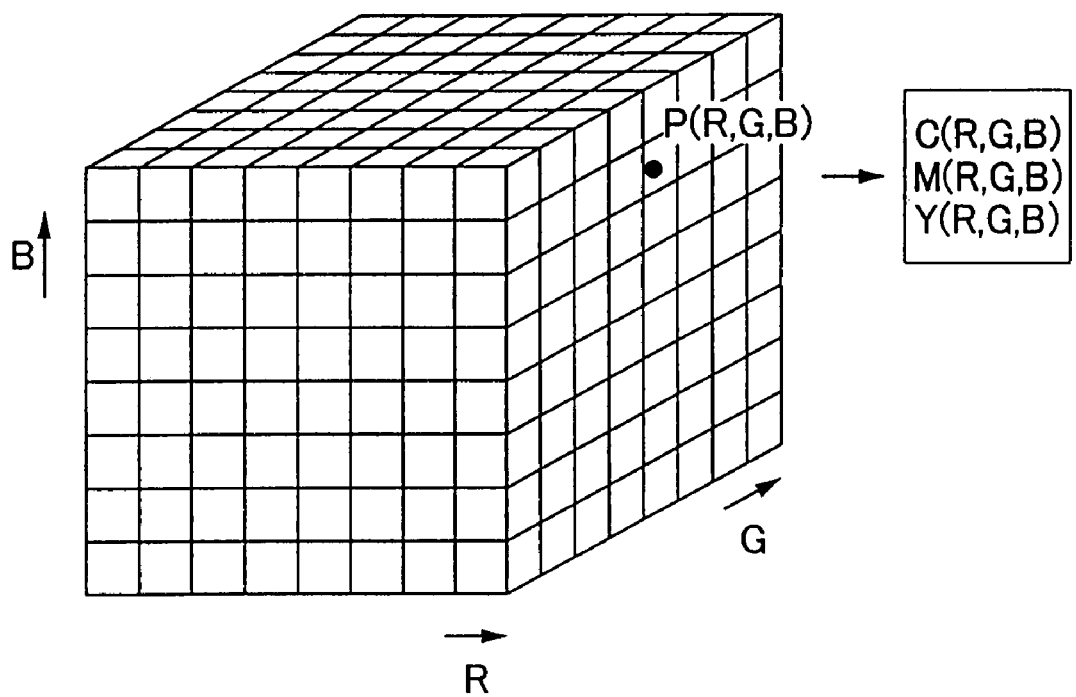
FIG. 25 illustrates a RGB space in color transformation processing according to the third embodiment of the present invention.

The interpolation operation part 636 carries out color transformation on the thus-sent image data of RGB according to memory map interpolation manner into CMY with reference to the color transformation table chosen from the color transformation tables stored in the color transformation table memory part 637. That is, as shown in FIG. 25, assuming that the RGB space is regarded as the input color space, the RGB space is divided into similar solid figures such as cubes. Then, in order to obtain an output value P on input coordinate (RGB), a cube including the input coordinate is selected, and linear interpolation is performed based on a relative position of the input coordinate with respect to vertexes of the cube (respective distances between the coordinate in the cube and vertexes). In this embodiment, the output values correspond to respective C, M, Y values, and, for the coordinate (RGB) in the input space, C, M, Y values are previously set on RGB (L*a*b*) calculated by least-squires method or the like by using data of actually measured input/output relationship between L*a*b* and CMY.

Furthermore, the CMY signal is converted into a CMYK signal by the following formulas (26):

$$K = \alpha \times \min(C, M, Y)$$

$$C' = C - \beta \times K$$

$$M' = M - \beta \times K$$

$$Y' = Y - \beta \times K \qquad (26)$$

The color transformation method is not limited thereto. For example, the computer may store characteristics of the image display device in header information of the image data, and sends out it. In case the above-mentioned image output control device is mounted into the computer, a device profile standardized by ICC (Inter Color Consortium) may be read out therefrom and used for the same purpose.

The printing data obtained through the memory map interpolation with the interpolation operation part 636 and color transformation into CMYK is sent to the drawing unit 634, gradation processing etc. is performed thereon, every page of the printing image data is temporarily stored in the image memory unit 635, and the printing image is printed out through the printer 615a.

Figure 26:
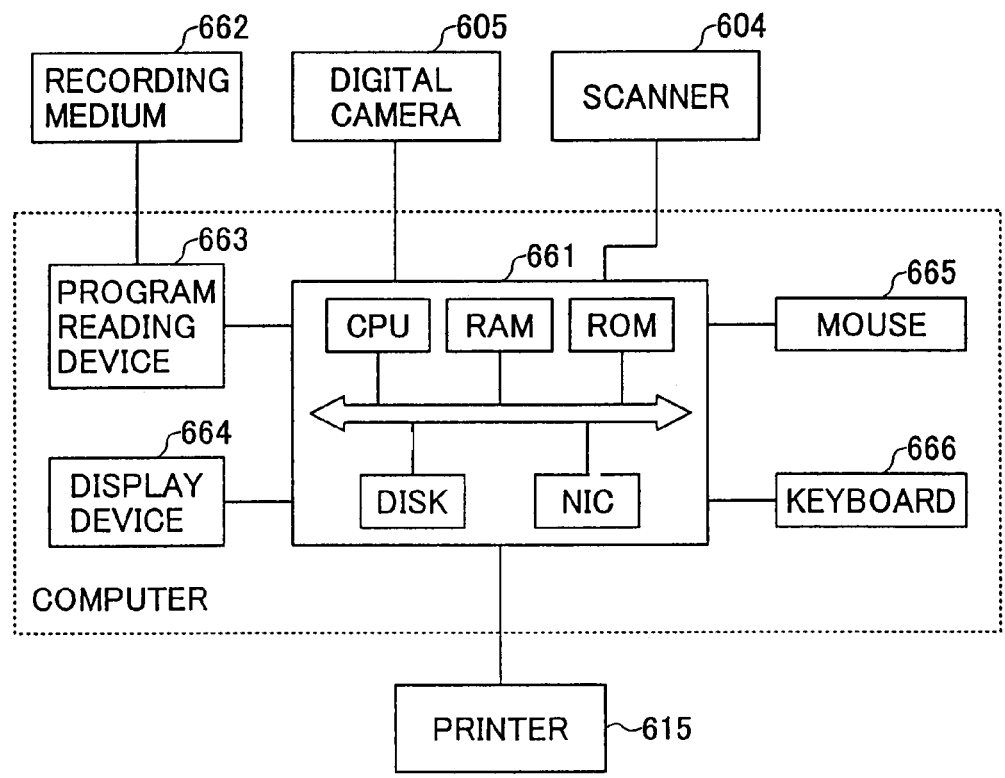
FIG. 26 shows a block diagram of a computer which can also embody the third embodiment of the present invention.

The above-mentioned description is description of the case where gradation correction processing is performed on the input image data by the gradation correction unit 617. However, a gradation correction processing program may be created for a computer to perform processing same as that performed by the above-mentioned gradation correction unit 617, stored in a memory media, such as, for example, a floppy disk, a hard disk, an optical disk, a magneto-optical disk, a memory card, or so. Then, as shown in a block diagram of FIG. 26, a personal computer 660 having an operation processing unit 661 including a CPU, a RAM, a ROM, a hard disk and so forth, a program reading unit 663 reading out the gradation correction processing program stored in a memory medium 662, a display device 664, a mouse 665, a keyboard 666, etc., may read the gradation correction processing program therefrom, and, according thereto, perform gradation correction processing on image data input from a digital camera 605, or the like.

The program codes memorized by the memory medium 662 is read out by the program reading device 663, is then stored in the disk, etc., and then, realizes the imager processing method described above according to the third embodiment of the present invention as a result of the program codes read out from the disk, etc. being executed by the CPU. Moreover, it is also possible that, by performing the program codes which the personal computer 660 reads out, based on instructions on the program codes, a part or all of the relevant processing is executed by an OS (operating system), a device driver, etc. which are working on the computer 660, and thereby the functions described above are realized.

Figure 27:
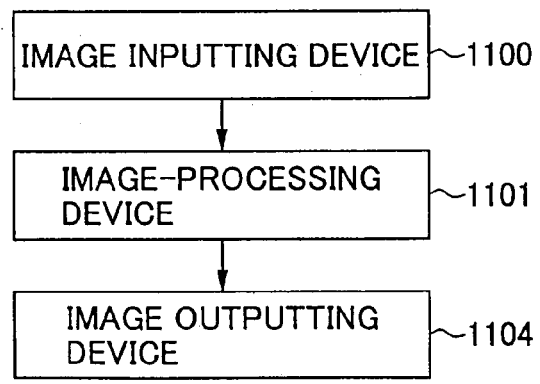
FIG. 27 shows a configuration of an image processing system according to a fourth embodiment of the present invention.
Figure 28:
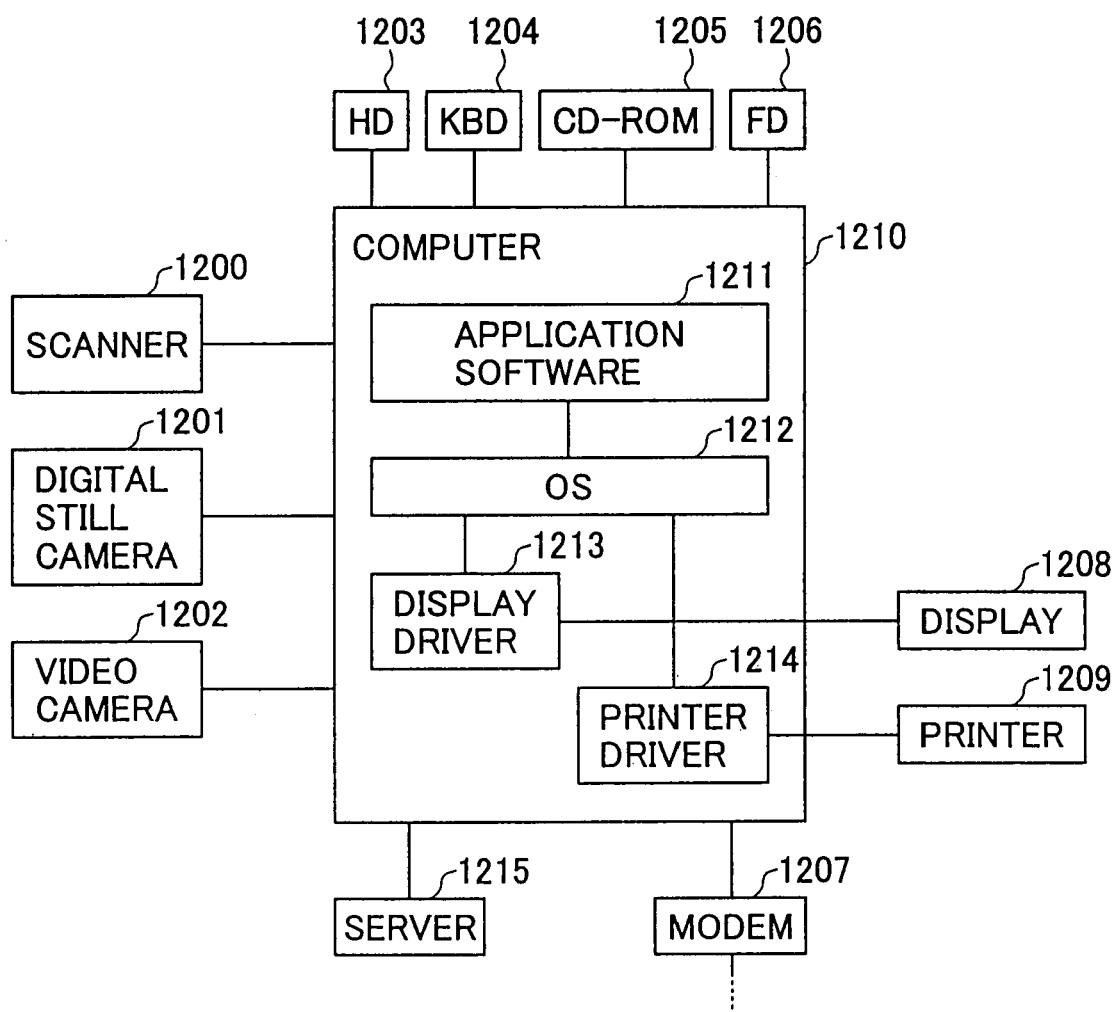
FIG. 28 shows a hardware configuration of the image processing system shown in FIG. 27.

A fourth embodiment of the present invention will now be described. FIG. 27 shows an example of configuration of an image processing system of the fourth embodiment. FIG. 28 shows an example of hardware configuration of the image processing system shown in FIG. 27. The image processing system of FIGS. 27 and 28 is configured to perform image processing for correcting automatically unsuitable exposure of an image taken by a digital camera, etc.

As shown in FIG. 27, this image processing system includes an image inputting device 1100 for inputting images (for example, image data of an actually picked-up photograph etc. expressed as a matrix of pixels), an image processing device 1101 which performs predetermined image processing on the image data input from the image inputting device 1100, and an image outputting device 1104 which outputs the image data (in dot matrix of pixels) having undergone image processing carried out by the image processing device 1101.

Further, as shown in FIG. 28, specifically, the image processing system of FIG. 27 includes a scanner 1200, a digital camera 1201, a video camera 1202, a hard disk drive (HD) 1203, a keyboard (KBD) 1204, a CD-ROM drive 1205, a floppy disk drive (FD) 1206, a computer 1210, a modem 1207, a display device 1208, a printer (for example, an ink-jet printer) 1209, and a server (having a data storage function) 1215.

The image inputting device 1100 of FIG. 27 corresponds to the scanner 1200, the image pick-up device (for example, digital camera) 1201, or the video camera 1202 in FIG. 28. The image processing device 1101 of FIG. 27 corresponds to the computer system which includes the computer 1210, hard disk drive 1203, keyboard 1204, CD-ROM drive 1205, floppy disk drive 1206, modem 1207, etc. The image outputting unit 1104 of FIG. 27 corresponds to the printer 1209, display device 1208, and server 1215 in FIG. 28.

In FIG. 28, for example, the modem 1207 is connected to a public communication circuit, and is used for downloading software and data to this image processing system etc. through an external network.

Moreover, in FIG. 28, in the computer 1210, an operating system (OS) 1212 is set up and a printer driver 1214 suitable for the printer 1209 and a display driver 1213 for the display device 1208 are incorporated. Moreover, within the computer 1210, execution control of processing of an image processing application 1211 under control of the operating system 1212 is performed. That is, within the computer 1210, the printer driver 1214 or the display driver 1213 operates if needed, while the predetermined image processing is performed cooperatively therewith.

Therefore, this computer 1210 acts as the image processing device 1101 which inputs gradation data of RGB from the image inputting device 1100, performs optimum image processing on the gradation data of RGB, stores the gradation data of RGB in the server 1215, displays the same on the display unit 1208 through the display drive 1213, changes the thus-obtained image data into binary data of CMY or CMYK through the printer driver 1214, and prints out it through the printer 1209.

In the image processing system of the configuration of FIG. 27, the image inputting device 1100 outputs image data of an actually picked-up photograph expressed in a matrix of pixels to the image processing device 1101. In case the image processing device 1101 performs a plurality of types of processing, an evaluation value is calculated based on an optimum evaluation function for each type of image processing, and the image processing is performed using the evaluation value. The image outputting device 1104 outputs image data having undergone the image processing thus carried out, in a form of a dot matrix of pixels.

Image processing accompanying the acquisition of the evaluation value for image processed mentioned above is performed in the image processing device 1101 of FIG. 27. Specifically, it is carried out within the computer 1210 of FIG. 28 according to the image processing application program 1211.

Figure 29:
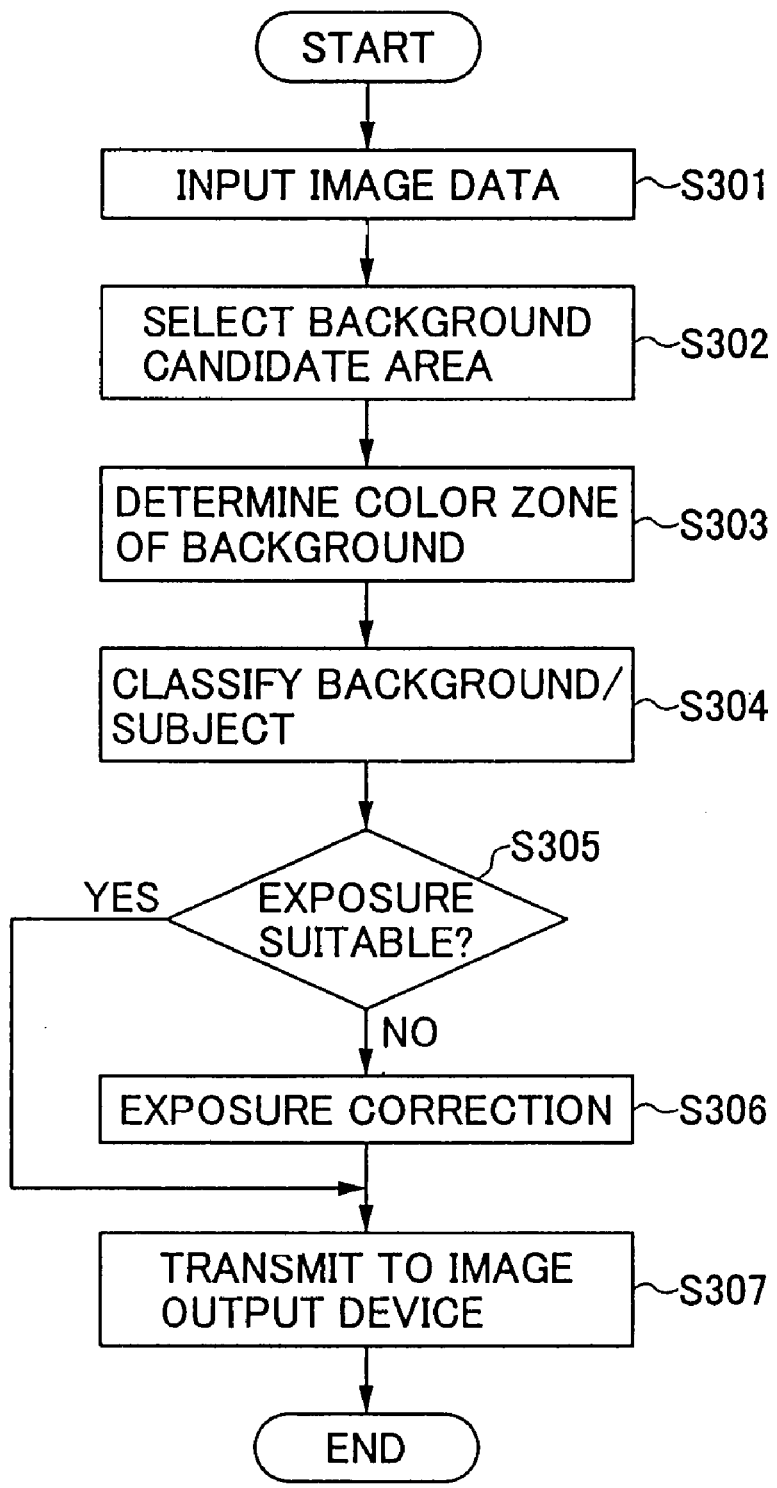
FIG. 29 shows a flow chart of image processing in an image processing device shown in FIG. 27.

FIG. 29 shows a flow chart which shows an example of image processing in the image processing device 1101 of FIGS. 27 and 28. Since the fourth embodiment of the present invention relates to a technology concerning exposure correction on a natural picture taken in by an image pick-up device etc., in the following example, input image data is assumed as RGB bitmap data.

As shown in FIG. 29, when image data is input (in a step S301), in the image processing device 1101, a background candidate area which may be a background with a high possibility is chosen first (In a step S302). Next, a color range of the background is determined (In a step S303) and the relevant image data is divided into a background area and a non-background area (that is, a photographic subject area) based on the determined color range of the background (In a step S304). Next, it is determined whether exposure is proper on the thus-obtained photographic subject area (in a step S305) and when it is determined that the exposure is unsuitable, exposure correction is performed in a step S306. Then, the resulting image data is transmitted to the image outputting unit 1104 (in a step S307).

In the image outputting device 1104, when the image outputting device 1104 is a printer, on the image data thus transmitted from the image processing device 1101, color transformation processing into a plurality of output color components C (Cyan), M (Magenta), Y (Yellow), and K (Black) is performed, and the result is used for printing out an image.

The gradation correction processing is performed according to the color reproducible range of the image outputting device 1104 on the image data transmitted from image processing device 1101. Next, color transformation is performed based on the color characteristic of the image data and the color characteristic of the image outputting device 1104, and the image data is changed into the color components C (Cyan), M (Magenta), and Y (Yellow) and K (Black) of data, and is sent to a drawing unit and an image storage unit (storage buffer).

Figure 47:
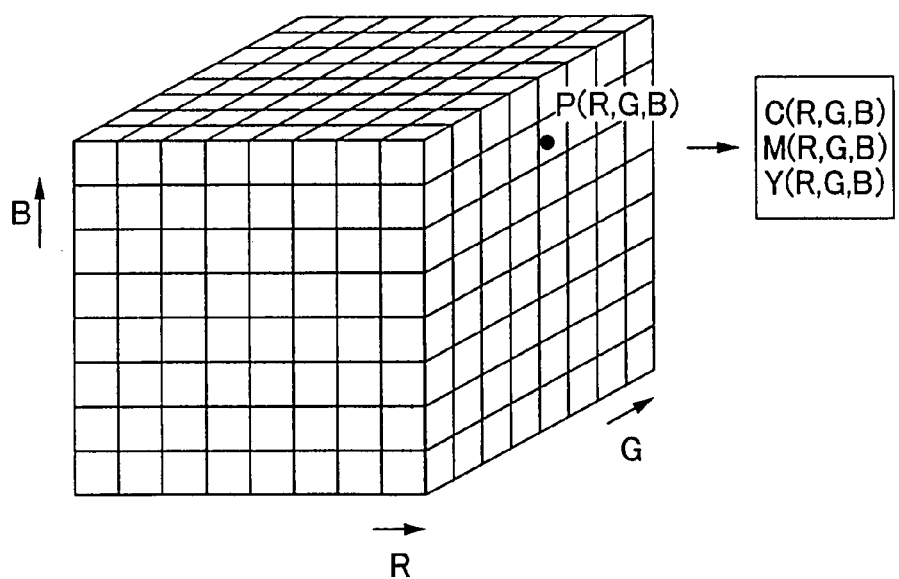
FIG. 47 illustrates a memory map interpolation scheme.

The color transformation into the output color components. C (Cyan), M (Magenta), Y (Yellow) and K (black) data from the RGB (green, blue, red) gradation data is carried out through memory map interpolation. That is, as shown in FIG. 47, assuming that the RGB space is regarded as the input color space, the RGB space is divided into similar solid figures such as cubes. Then, in order to obtain an output value P on an input coordinate (RGB), a cube including the input coordinate is selected, and linear interpolation is performed based on a relative position of the input coordinate with respect to the vertexes of the cube (respective distances between the coordinate in the cube and the vertexes). In this embodiment, the output values correspond to respective C, M, Y values, and, for the coordinate (RGB) in the input space, C, M, Y values are previously set on RGB (L*a*b*) calculated by least-squires method or the like by using data of actually measured input/output relationship between L*a*b* and CMY).

Furthermore, the CMY signal is converted into a CMYK signal by the following formulas:

$$K=\alpha \times \min(C,M,Y)$$

$$C'=C-\beta \times K$$

$$M'=M-\beta \times K$$

$$Y'=Y-\beta \times K$$

The color transformation method is not limited thereto. For example, the computer may store characteristics of the image display device in header information of the image data, and sends out it. In case the above-mentioned image output control device is mounted into the computer, a device profile standardized by ICC (Inter Color Consortium) may be read out therefrom and used for the same purpose.

Figure 30:
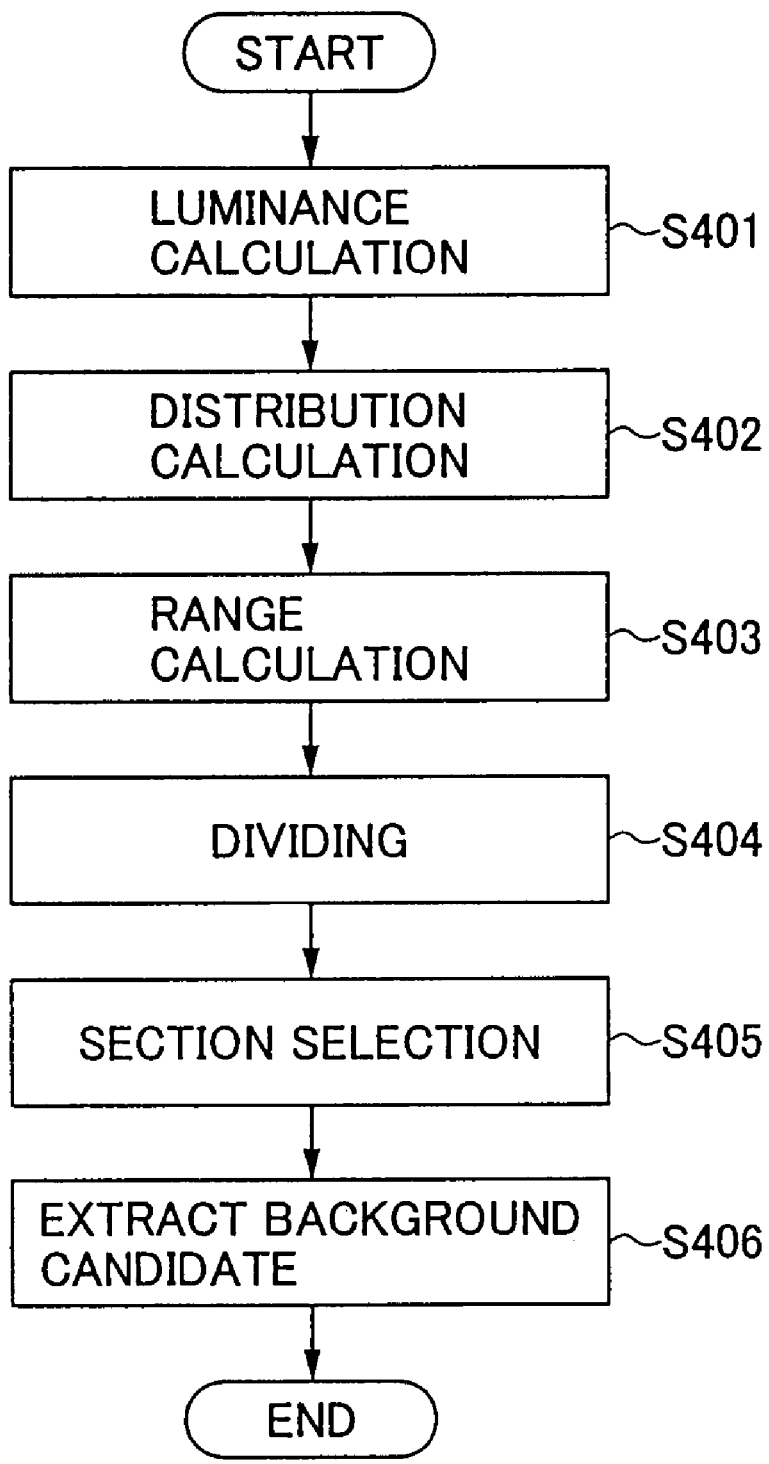
FIG. 30 shows a flow chart of background candidate area selection and extraction processing according to the fourth embodiment of the present invention.

Next, the processing of selecting the background candidate area in the step S302 of FIG. 3 will now be described in detail. FIG. 30 is a flow chart for illustrating the processing of selection/extraction of background candidate area. In this example, a background candidate area is obtained from luminance information on given image data.

With reference to FIG. 30, first the luminance value of each pixel of the relevant image (image data input at in the step S301) is calculated (in a step S401). There, assuming that the luminance value is referred to as y, the luminance value y is calculated by the following formula:

$$y=0.30R+0.59G+0.11B$$

Figure 31:
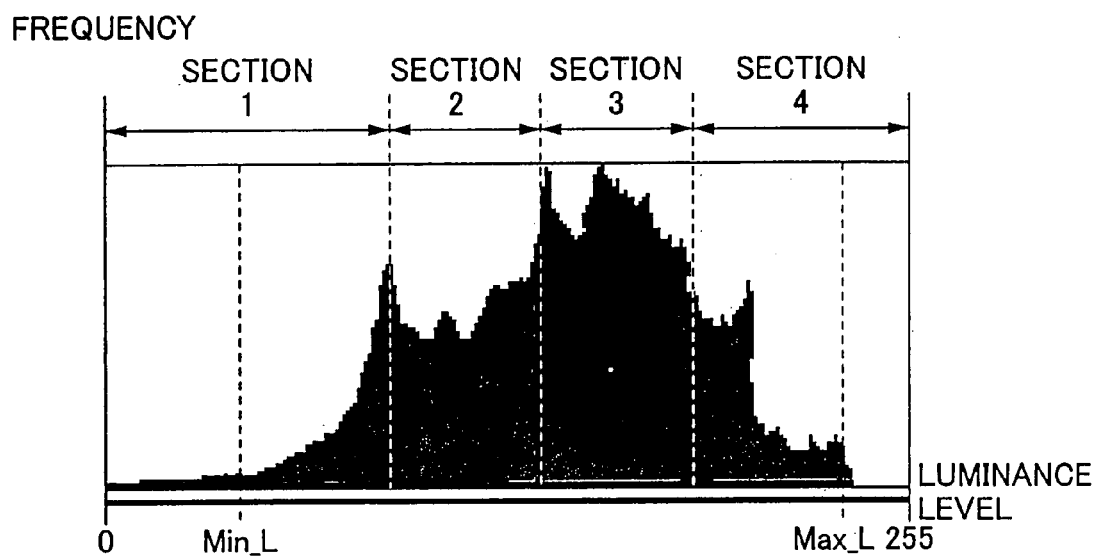
FIG. 31 illustrates a luminance distribution calculated according to the fourth embodiment of the present invention.

Then, after the luminance value y is calculated, a luminance distribution on the entire image data is calculated in a step S402. The thus-calculated luminance distribution is shown in FIG. 31, for example. In FIG. 31, the horizontal axis represents the luminance value (luminance level) y of the input image data, and the vertical axis represents the occurrence frequency of the luminance value y.

Next, in order to extract a bright zone and a dark zone on the relevant image, the range (dynamic range) of the above-mentioned luminance distribution is calculated (in a step S403). The calculation of the range (dynamic range) is made as follows:

As shown in FIG. 31, first, the luminance values are calculated at which the occurrence frequency accumulation ratio from the both ends (0 and 255) of the luminance distribution reach 1% of all the occurrence frequency, respectively. Then, the thus-obtained values are regarded as the lower limit value Min_L, and upper limit value Max_L, and the distribution range is defined thereby.

Thus, after the calculation of the range (dynamic range) is made, this range is equally divided into four luminance sections, i.e., from the darker one, Section 1, Section 2, Section 3 and Section 4 (in a step S404).

Specifically, Section 1 is defined as a range of less than [Min_L+(Max_L−Min_L)/4]; Section 2 is defined as a range not less than [Min_L+(Max_L−Min_L)/4] and less than [Min_L+2×(Max_L−Min_L)/4]; Section 3 is defined as a range not less than [Min_L+2×(Max_L−Min_L)/4] and less than [Min_L+3×(Max_L−Min_L)/4]; and Section 4 is defined by a range not less than [Min_L+3×(Max_L−Min_L)/4], as shown in FIG. 31.

Next, the luminance zone for the background candidate area is chosen (in a step S405). The luminance zone is determined appropriately according to a scene of the relevant photograph image to be processed. For example, the following scenes are expected:

Night photography: portrait picture picked up at a night, using a flash light, for example;

Backlight, half-backlight: picture which has a light source behind of a photographic subject;

Underexposure: picture with insufficient light quantity at the time of photography, and thus, dark on the whole;

Proper (follow light): picture on which exposure adjustment has accomplished appropriately.

How to obtain such scene information from the input image data is already described above in conjunction with Exif Version 2.2 in the description on the first embodiment.

Figure 32:
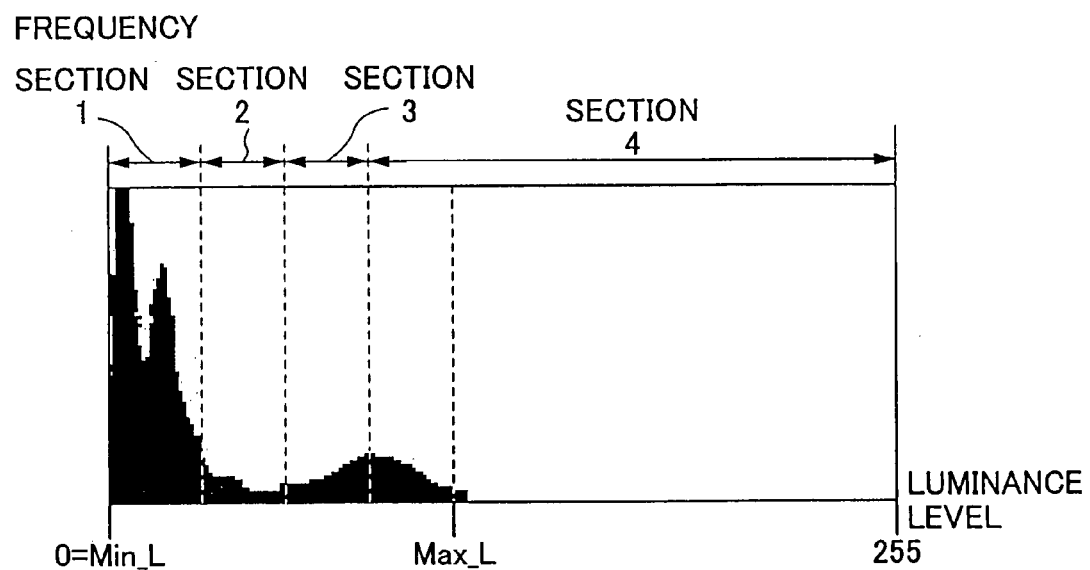
FIG. 32 illustrates a luminance distribution of night portrait photograph in an example calculated according to the fourth embodiment of the present invention.

For example, since it can be considered that the background is in a dark portion relatively in a picture when the relevant image is of night photography, an area in the image belonging to Section 1 which is the darkest section is determined as a background candidate area. The luminance distribution and section dividing manner on a night portrait picture is shown in FIG. 32, for example.

Figure 33:
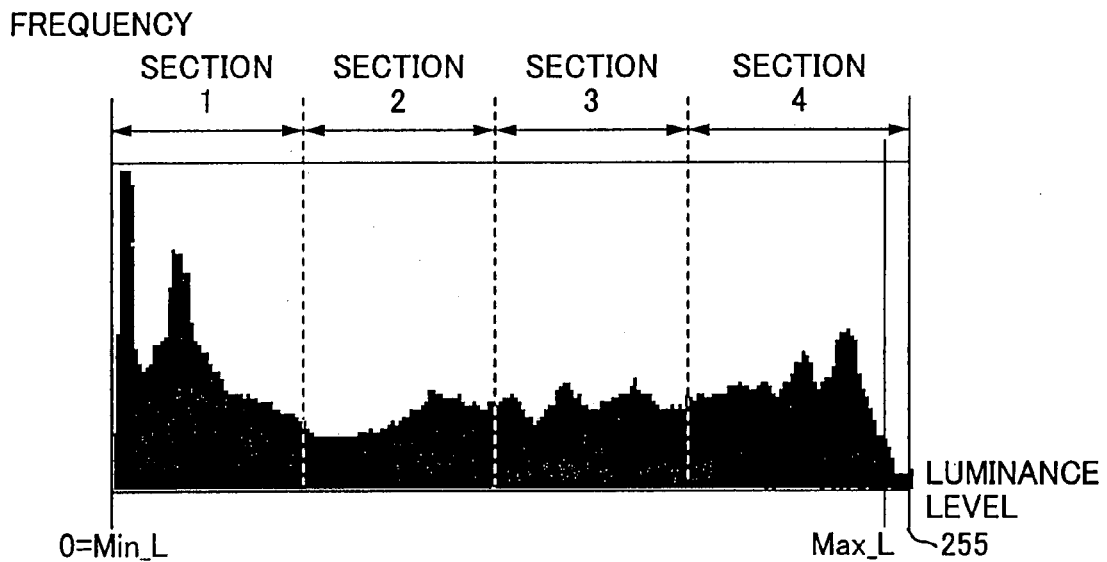
FIG. 33 illustrates a luminance distribution of half-backlight photograph in one example calculated according to the fourth embodiment of the present invention.

Moreover, since it can be considered in a case of a backlight or a half-backlight picture that a background is in a bright portion relatively in a picture, the image area belonging to Section 4 which is the brightest section is determined as a background candidate area. A luminance distribution and section dividing manner on a half-backlight picture is shown in FIG. 33.

Thus, selection/extraction of background candidate area is made (in a step S406). In addition, in the above-mentioned example, the range of luminance is defined by the luminance values at which he occurrence frequency accumulation ratio reach 1% from the both luminance level ends. However, it is also possible to prepare threshold on an occurrence frequency with respect to total number of pixels, etc., instead. Moreover, the above-mentioned percentage is not limited to 1%.

Moreover, in the above-mentioned example, the range of luminance is divided into four sections. However, it is also possible to appropriately select the number of divisions. Furthermore, the dividing manner may also be appropriately selected, for example, it is possible to employ a dividing method of dividing with respect to accumulated occurrence frequency.

Moreover, the input image type may also be appropriately selected other than RGB type, and, instead, L*a*b* type may be selected. In this case, it is necessary to use L*, a*, and b* for color components, and for luminance, use L.

Moreover, in order to make the processing at high speed, a pixel thinning scheme may be applied, or as the luminance information, simple arithmetic average of RGB, or only G component thereof may be used.

Figure 34:
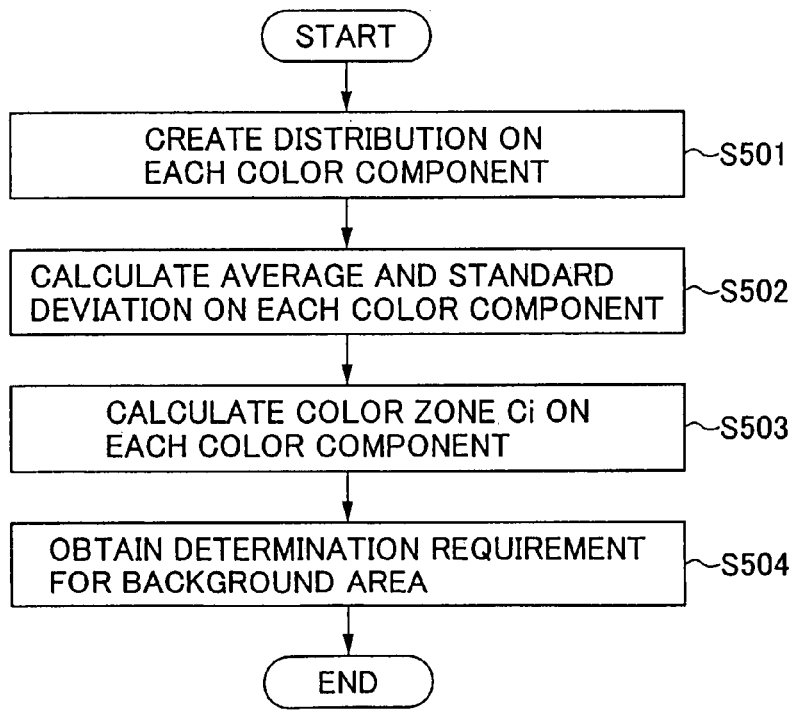
FIG. 34 shows a flow chart of background color range setting processing according to the fourth embodiment of the present invention.
Figure 35:
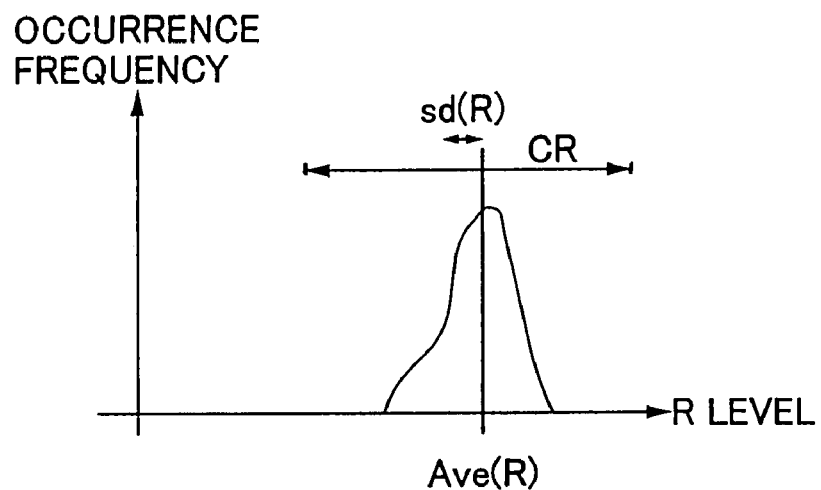
FIGS. 35, 36 and 37 illustrate color component distribution on R, G and B in one example, respectively.
Figure 36:
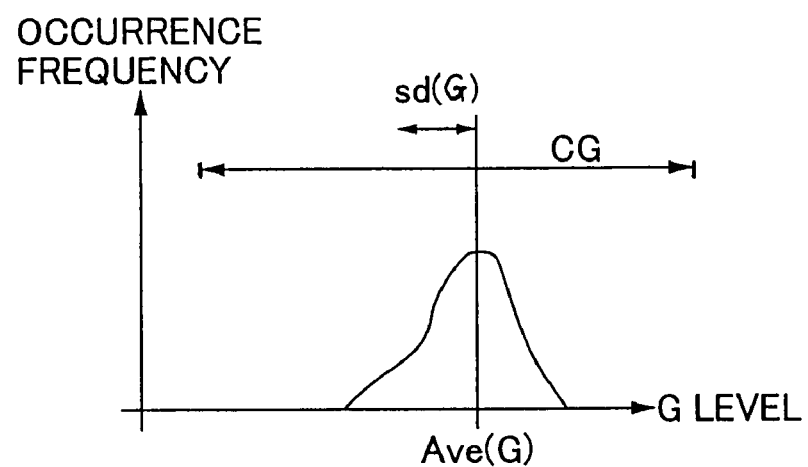
Figure 37:
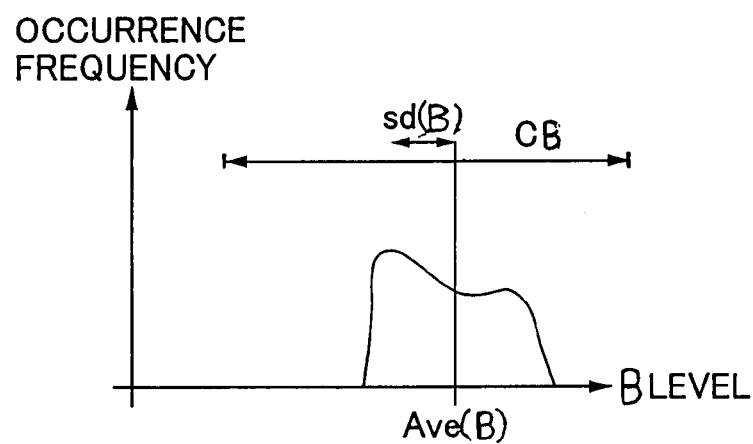

Next, the background color range setting processing (in the step S303) of FIG. 29 will now be described in detail with reference to FIG. 34. In background color range setting processing, each color component distribution of the background candidate area obtained by the above-mentioned background candidate area selection processing (in the step S302) is first obtained on the input image data (in a step S501). That is, the distribution for every color component is prepared. The distribution of each color component of R, G, and B, for example, is shown in FIGS. 35, 36 and 37, respectively.

Next, the average value Ave(i) (i=R, G or B: color component), and a standard deviation value sd(i) on each color component are calculated (in a step S502).

Next, background color range is set up for every color component (in a step S503). That is, a color range Ci(i=R, G, B) which each color component i can have is calculated. There, the color range Ci(i=R, G, B) which each color component can have is set up by the following formula:

$$\text{Ave}(i) - n1 \times sd(i) \leq Ci \leq \text{Ave}(i) + n2 \times sd(i) \qquad (27)$$

In the above formula, n1 and n2 denote constants, and, according to an experiment of the present inventors, it is preferable in case of night portrait picture that n1=3, n2=4. Similarly, in case of backlight picture, it is preferable that n1=4 and n2=3.

FIGS. 35, 36 and 37 also show the sizes of sd(i) and the range of Ci, respectively.

The background color range is a color space which satisfies the above-mentioned requirement Ci on all color components simultaneously. That is, the background area is defined by pixels belonging thereto each having pixel value 'r', 'g', 'b', satisfying the following requirement (in a step S504).

$$(r \subset CR) \cap (g \subset CG) \cap (b \subset CB) \qquad (28)$$

Moreover, by making color range setting not on the whole image but on a local part thereof, since there are few number of colors included in the background candidate area in the local part, color range narrows and thus, it is possible to achieve a strict setup.

Figure 38:
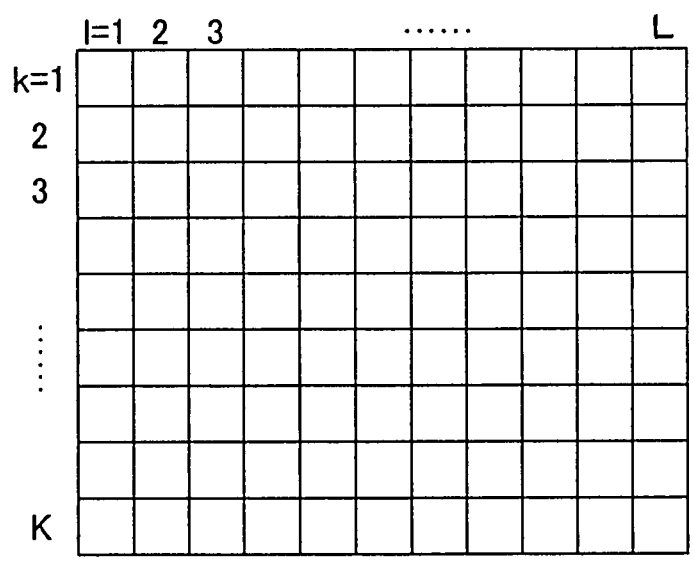
FIGS. 38, 39, 40 and 41 illustrate background color range setting processing for various cases according to the fourth embodiment of the present invention.

Specifically, the input image is divided into K×L divisions by dividing by K in vertical direction and dividing by L in horizontal direction. Then, a background is set up for every division area thus obtained. In this case, first, as shown in FIG. 38, the image is thus divided, and each area thus obtained is numbered (k=1, 2, ..., K; l=1, 2, ... L).

Figure 39:
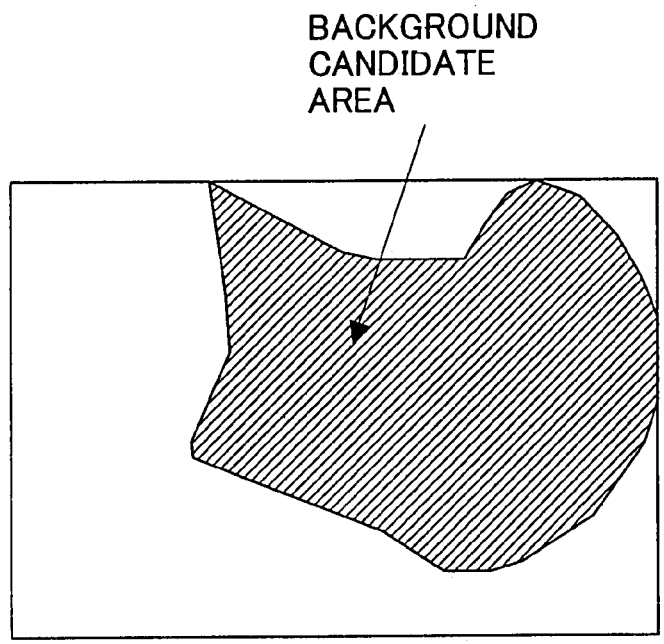

Next, processing on an area (k, l) will now be described with reference to FIG. 39. FIG. 39 shows the state on the area (k, l). Further, in FIG. 39, a black portion represents a background candidate area.

As the processing on the area (k, l), background color range on the area (k, l) is set up for every color component. The color range C(i, k, l) which the color component i can have is set up by the following formula using the average value Ave(i, k, l) and the standard deviation value sd(i, k, l) for the color component i on the background candidate area (black portion of FIG. 39) in the area (k, l).

$$\text{Ave}(i,k,l) - n1 \times sd(i,k,l) \leq C(i,k,l) \leq \text{Ave}(i,k,l) + n2 \times sd(i,k,l) \qquad (29)$$

In the above formula, n1 and n2 denote constants. Although the standard deviation value (sd) of the distribution is employed for evaluating a spread of the color distribution in the above-mentioned example, the difference between the average value and the minimum value, the difference between the maximum value and the average value, etc. may also be employed, instead.

The color range of the background in the area (k, l) is a color space which satisfies the requirement C(i, k, l) for all the color components simultaneously. That is, a background area on the area (k, l) is defined by pixels belonging thereto each pixel value r, g, and b satisfying the following requirement:

$$(r \subset C(R,k,l)) \cap (g \subset C(G,k,l)) \cap (b \subset C(B,k,l)) \qquad (30)$$

Figure 40:
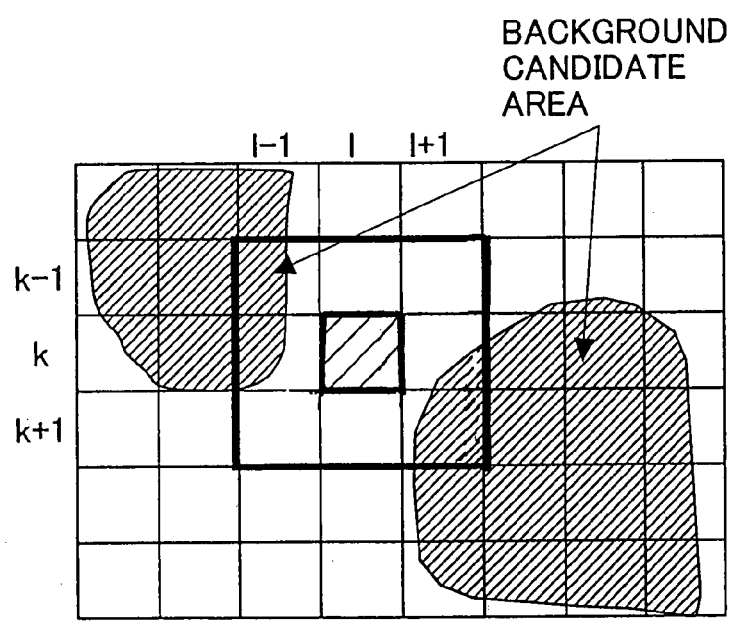

When no background candidate area exists in the area (k, l), the color range on neighboring areas are also referred to. For example, in a case shown in FIG. 40, since no background candidate area exists in the hatched relevant area (k, l), the average value in color range on the areas (k−1, l−1), (k, l−1), (k, l+1) and (k+1, l+1) where background candidate areas exist out of the eight peripheral/neighboring areas contiguous to the relevant area (k, l) is calculated, and thus, the color range on the area (k, l) is set up. That is, it is set up by the following formula.

$$\{(\text{Ave}(i,k-1, l-1) + \text{Ave}(i,k,l-1) + \text{Ave}(i,k,l+1) + \text{Ave}(i,k+1,l+1)) - n1 \times (sd(i,k-1,l-1) + sd(i,k,l-1) + sd(i,k,l+1) + sd(i,k+1,l+1))\}/4 \leq C(i,k,l) \leq \{(\text{Ave}(i,k-1,l-1) + \text{Ave}(i,k,l-1) + \text{Ave}(i,k,l+1) + \text{Ave}(i,k+1,l+1)) + n2 \times (sd(i,k-1,l-1) + sd(i,k,l-1) + sd(i,k,l+1) + sd(i,k+1,l+1))\}/4 \qquad (31)$$

Figure 41:
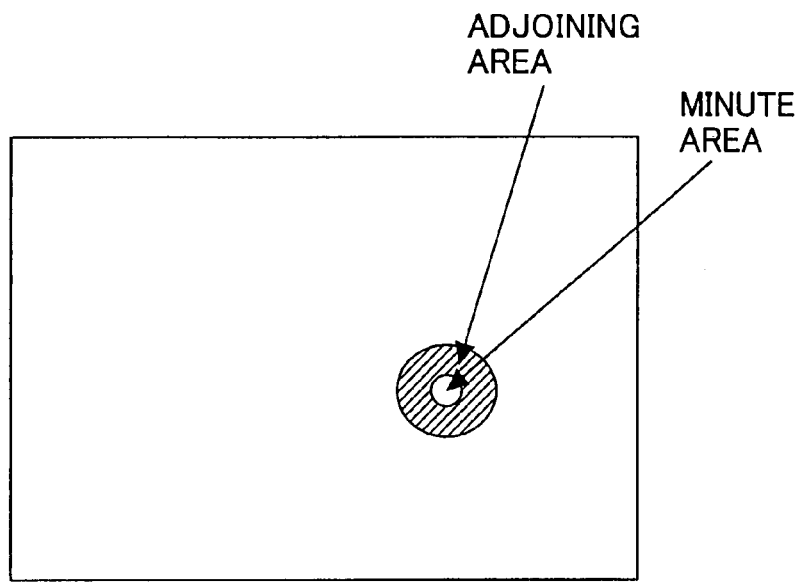

There, the relevant area may not be such a division area, but an arbitrary area, for example, a minute area shown in FIG. 41, may be employed, and, similarly, the above-mentioned contiguous (peripheral/neighboring) areas thereof may be an adjoining area hatched shown in the same figure.

Thereby, the background color range can be set up (in a step S504, in the step S303 of FIG. 30).

Next, processing in the step S304 of FIG. 30, i.e., the processing for classifying the relevant image into a photographic subject area and a background area, will now be described in detail.

Figure 42:
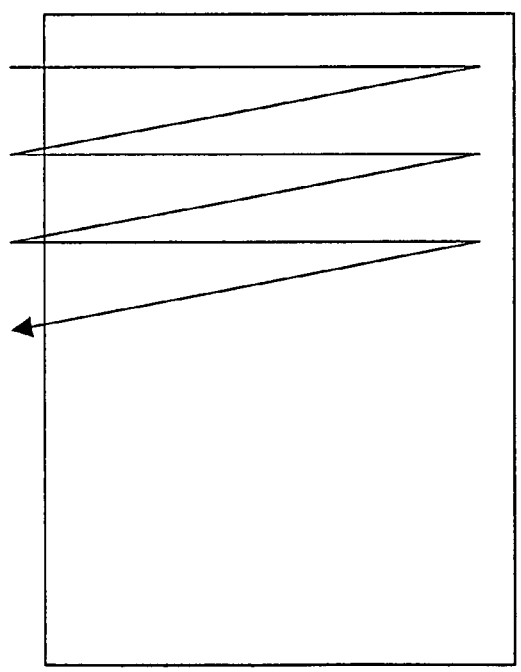
FIG. 42 illustrates raster scanning performed on a relevant image according to the fourth embodiment of the present invention.

In the processing on the step S304, it is determined whether each pixel belongs to a background area, by carrying out raster scanning on the relevant image, as shown in FIG. 42. There, the determination is made according to the above-mentioned formula (28) or (30). Then, when the determination result is that the relevant pixel does not belong to the background area, it is then regarded as the photographic subject area and the information is output to the storage device.

Figure 43:
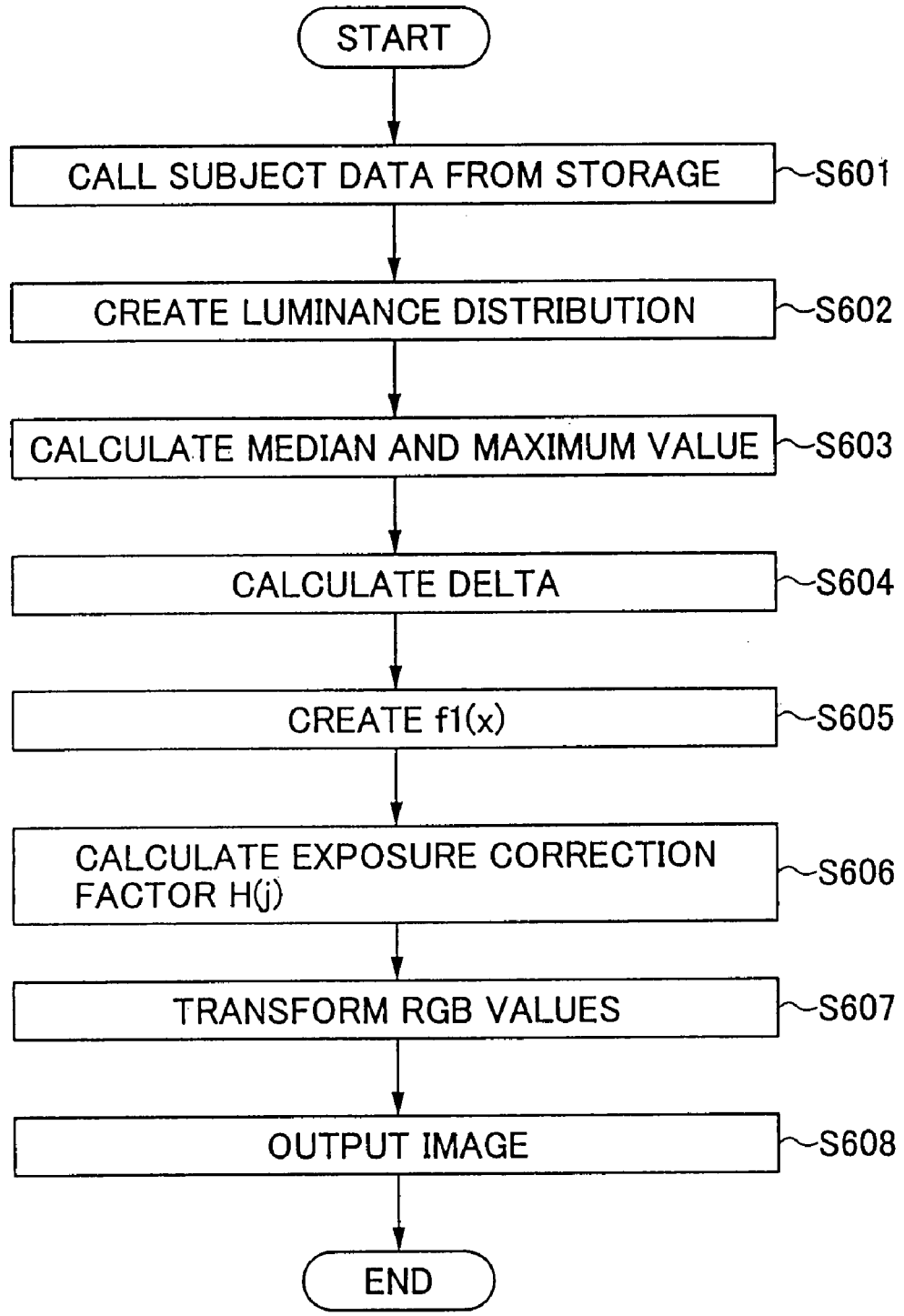
FIG. 43 shows a flow chart of exposure determination processing and exposure correction processing according to the fourth embodiment of the present invention.

Next, processing on the steps S305 and S306 in FIG. 30, i.e., exposure determination processing in which it is determined whether or not the exposure on the photographic subject area is proper, and exposure correction processing, will now be described with reference to a flow chart of FIG. 43.

Figure 44:
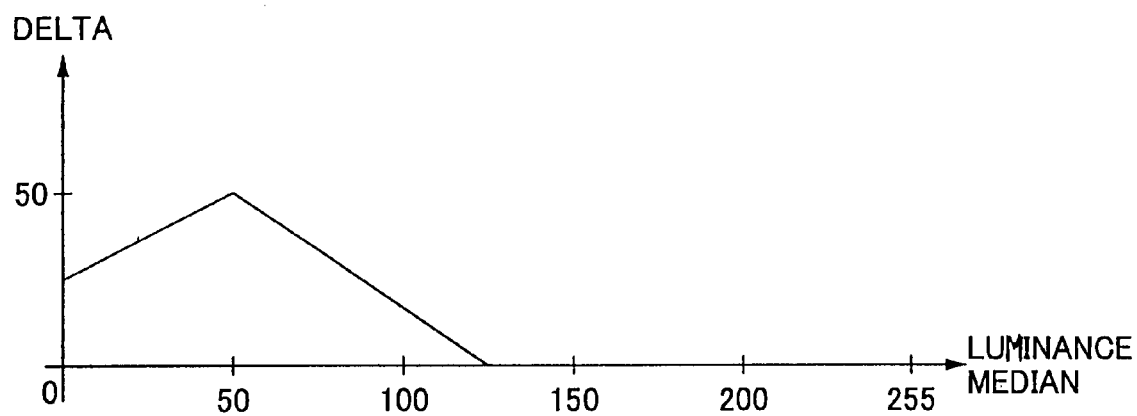
FIG. 44 illustrates a correction reference with respect to luminance median according to the fourth embodiment of the present invention.

First, data on the photographic subject area is read from the storage device (in a step S601). Then, a statistical amount on the features of the photographic subject area is calculated, and it is determined whether or not the exposure on the relevant image data is proper. In the example of FIG. 43, a luminance distribution is prepared (in a step S602) and the luminance median etc. is calculated from the luminance distribution (in a step S603), and a correction degree delta is determined according to the thus-calculated luminance median (in a step S604), and it is determined whether or not the exposure on the image data is proper. FIG. 44 shows an example of the correction degree delta with respect to the luminance median.

After that, when it is determined that the photographic subject has insufficient exposure (underexposure) as a result of the above-mentioned determination, correction is performed. In the example of FIG. 43, the correction is performed by using a tone curve or correction curve f1(x). That is, in the example of FIG. 43, when the median etc. is calculated from the luminance distribution calculated on the photographic subject area and the amount of correction is then calculated, the correction curve f1(x) is set up by the following formula (in a step S605):

$$f1(x) = ((B + \text{delta})/B) \cdot x \text{ (for } 0 < x < B\text{)}; \ ((255 - B - \text{delta})/(255 - B)) \cdot x - (\text{delta} \cdot 255)/(255 - B) \text{ (for } B \leq x < 255) \qquad (32)$$

Figure 45:
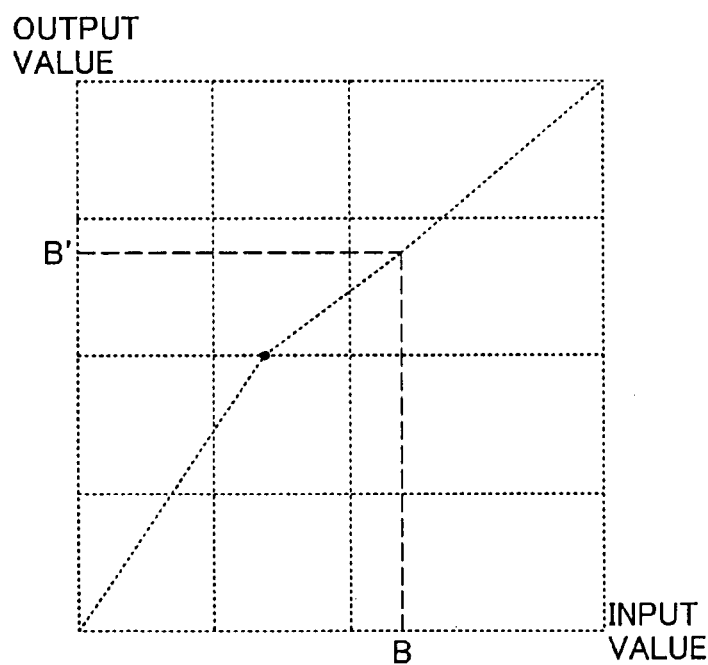
FIGS. 45 and 46 show two types of correction curves according to the fourth embodiment of the present invention.

There, B denotes the luminance maximum on the photographic subject area. Further, the correction curve is shown in FIG. 45, for example. When the correction curve is determined, the following transformation is performed for the exposure correction:

Namely, the luminance value on a relevant pixel j in the relevant image is referred to as an input luminance value $Y1(j)$ (j=1, 2, ... N; N denotes the number of pixels), the output luminance value $Y2(j)$ ($=f1(Y1(j))$) obtained after the tone curve transformation is performed on $Y1(j)$ is calculated, and an exposure correction coefficient H(j) is calculated by the following formula (in a step S606).

$$H(j) = Y2(j)/Y1(j) \quad (33)$$
$$= f1(Y1(j))/Y1(j)$$

Subsequently, the RGB values (R(j), G(j), and B(j)) on the pixel j are transformed by the following formula (in a step S607) by using the thus-obtained exposure correction coefficient H(j), and after that, the resulting image data is used for outputting an output image (in a step S608):

$$(Ro(j), Go(j), Bo(j))=H(j)\cdot(R(j), G(j), B(j)) \quad (34)$$

Figure 46:
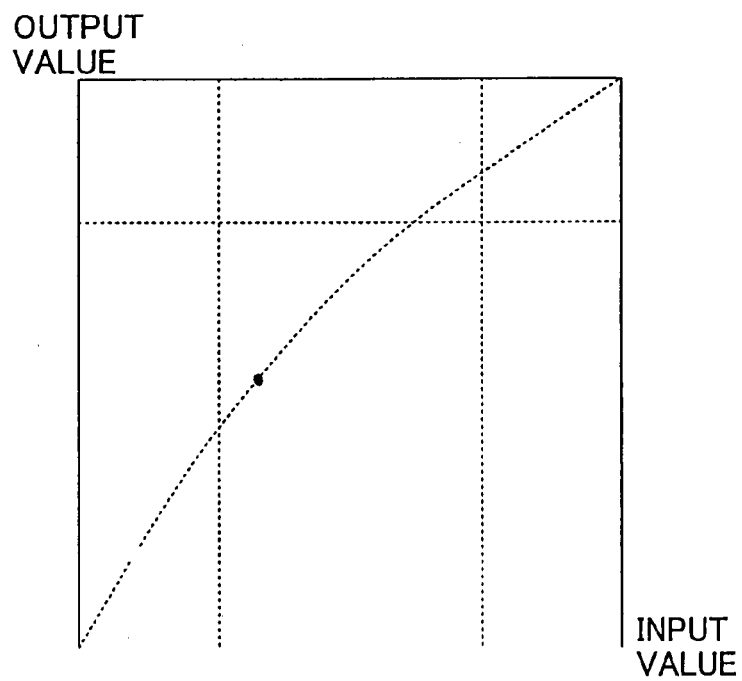

The tone curve (correction curve) is determined using the straight line on which the inclination differs (see FIG. 45), in the above-mentioned example. However, it is also possible to determine the tone curve by using a curved line such as a spline, as shown in FIG. 46, for example, instead.

Moreover, although the curve is determined to pass through three points including the end points in the above-mentioned example, the number of nodes to be applied should not be limited thereto. For example, there is a case where the background should not be bright in case of night photography. In such a case, a plurality of nodes may be set on a shadow side part, and thus, the output level on the shadow side part may not be altered even through the exposure correction. Moreover, when there is a possibility that the gradation on a highlight side part is expected to be problematically lost as a result of the tone curve correction, a plurality of nodes may be set on the highlight side part, and thus, the gradation on the highlight should be maintained.

As mentioned above, according to the fourth embodiment of the present invention, a background area color range setting function is provided to set up a color range on a background area using information on a background candidate area which has a high possibility of belonging to the background in the image processing device which thus extracts the background area from input color image data. Thus, by setting up the color range for the background area using the information on the background candidate area having a high possibility of belonging to the background, it is possible to extract areas having equivalent chromaticness at high accuracy as the background area.

The above-mentioned background area color range setting function sets up the size of color range for the background area more specifically according to the spread degree of the distribution of the color component belonging to the background candidate area. Thereby, the size of color range for the background area can be set up according to the color distribution spread degree which the background candidate area has.

Moreover, the above-mentioned background area color range setting function sets up the color range for the background area using the average value and standard deviation value which can be found from the values on color components belonging to the background candidate area. Thereby, the size of color range for the background area can be set up according to the spread degree of the color distribution which the background candidate area has.

There, the background candidate area on a night photography scene picture is an area corresponding to the darkest part of at least two levels classified with respect to the brightness of a relevant image.

Moreover, the background candidate area of a backlight and a half-backlight scene picture is an area corresponding to the brightest part of at least two levels classified with respect to the brightness of a relevant image.

Thus, the optimum background candidate area according to the scene can be chosen.

Moreover, the background area color range setting function sets up color range for the background area in each division/minute area using information on a background candidate area having a high possibility of belonging to a background included in the division/minute area. Thereby, color range for the background area can be set up strictly.

Moreover, the background area color range setting function sets up color range for the background area on the division/minute area using information on division/minute areas in the vicinity of the target division/minute area and having the color range information for the background area, when no background candidate area exists in the relevant division/minute area. Thus, even when no background candidate area exists in the relevant division/minute area, information on the background candidate areas in the neighboring areas can be utilized, and, thus, background can be properly extracted.

Figure 48:
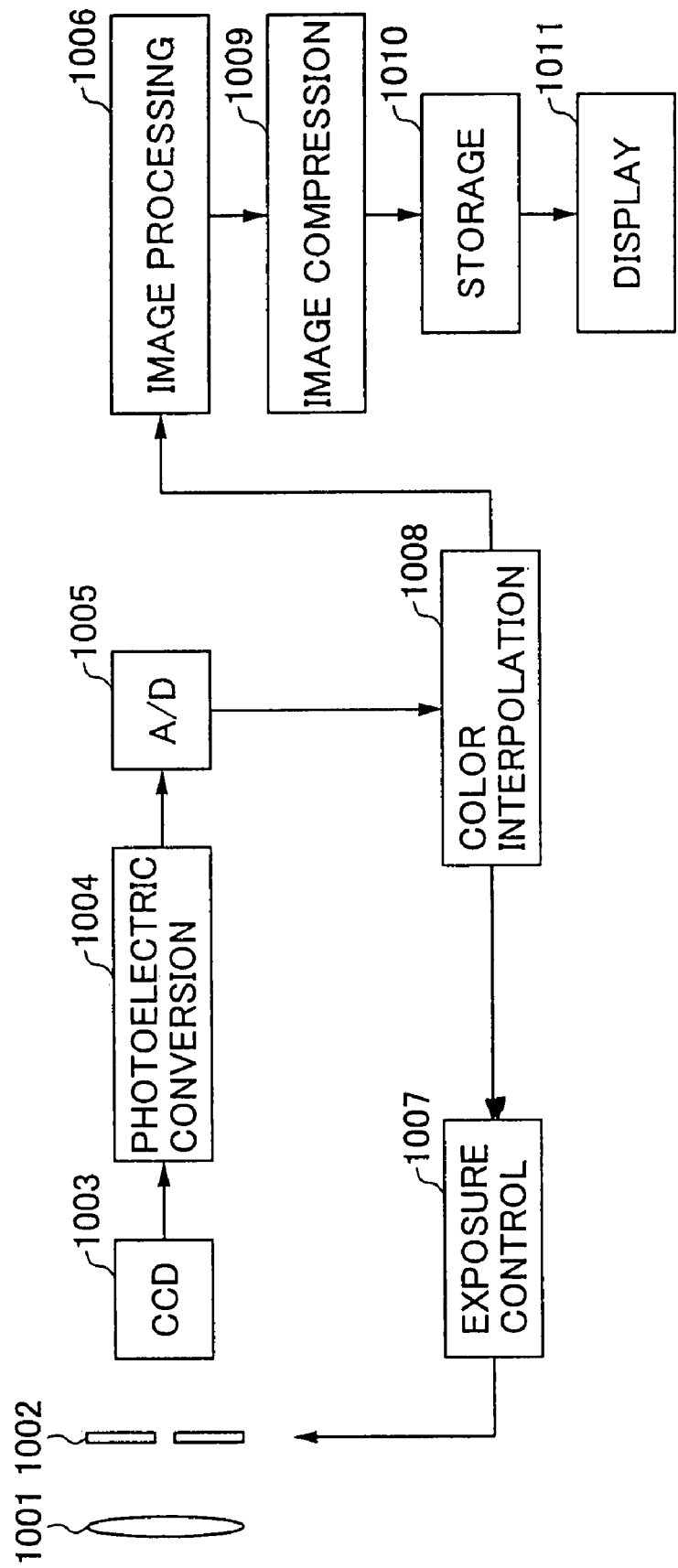
FIG. 48 shows a system configuration of a digital camera to which the fourth embodiment of the present invention is applied.

FIG. 48 shows an example of a system applying an image processing device, an image processing method, and a recording medium according to the fourth embodiment of the present invention to a digital camera.

As shown in the figure, this digital camera has an image pick-up optical system (lens) 1001, an iris diaphragm 1002, an image pick-up element (for example, CCD) 1003, a photoelectric conversion part 1004, an A/D conversion part 1005, an image processing part 1006, an exposure control part 1007 that controls exposure on a screen, a color interpolation part 1008, an image compression part 1009, a storage part 1010, and a display part 1011.

Processing operation of the digital camera of such a configuration will now be described.

In addition, exposure control and automatic focusing are performed just before photography in this digital camera. Light from a photographic subject is imaged on the screen of the image pick-up element (for example, CCD) 1003, after entering image pick-up optical system 1001 and being controlled in light quantity by the iris diaphragm 1002. Photoelectric conversion is carried out in the photoelectric conversion part 1004 thereon, and the photographic subject information imaged on the image pick-up element 1003 is sent to the A/D conversion part 1005 as an electric signal.

Next, after the analog signal is converted into a digital signal by the A/D conversion part 1005 and color interpolation is performed thereon by the color interpolation part 8, it is output to the image processing part 1006 and the exposure control part 1007.

In the image processing part 1006, in order to raise quality of image on the digital output signal coming from the A/D conversion part 1005, contrast correction processing, edge emphasis processing, false color correction processing, etc. are performed thereon.

Then, by the image compression part 1009, the data output from the image processing part 1006 is compressed and formed into a data stream. The data stream is stored in the storage part 1010. There, a floppy disk, MO, a memory card, etc. may be applied as the storage part 10.

The data stream stored in the storage part 1010 can be reproduced on the display part 1011 (for example, a display device of a personal computer etc.). Other than it, various methods for reproduction may be considered, i.e., outputting to a printer, etc.

In the exposure control part 1007, it is determined whether the exposure is appropriate, and when not suitable, the iris diaphragm 1002 and/or shutter speed on the image pick-up optical system (for example, lens) are adjusted at the time of photography.

The processing in the exposure control part 1007 will now be described in detail. In the exposure control part 1007, a background candidate area of image data input into the exposure control part 1007 is extracted. For example, since it can be regarded as night photography when there is pre-driving of a flash light, a background candidate area is determined as an image area belonging to Section 1 which is the darkest section in FIG. 32. In the other case, an image area belonging to Section 4 which is the brightest section is determined as a background candidate area.

Next, an average value and a standard deviation value are calculated for every color component from the color information on the thus-obtained background candidate area, and color range for the background area is set up according to the above-mentioned formulas (27) through (31). Next, raster scanning of the image is performed, and thus the color value on each pixel is examined as to whether or not it belongs to the background area. Then, when it is determined as a photographic subject area, a brightness value is calculated thereon by the following formula:

$$y = 0.30R + 0.59G + 0.11B$$

A brightness distribution on the whole image is then calculated therefrom, and the median thereof is output.

Next, it is determined using the median whether or not the exposure on the photographic subject is proper. For example, in case of night photographic image, it can be determined as underexposure when the subject median is less than 40. In such a case, the light quantity of the flash light at the time of actual photography is increased, or the shutter speed is lowered, and thus, the exposure is adjusted.

Figure 49:
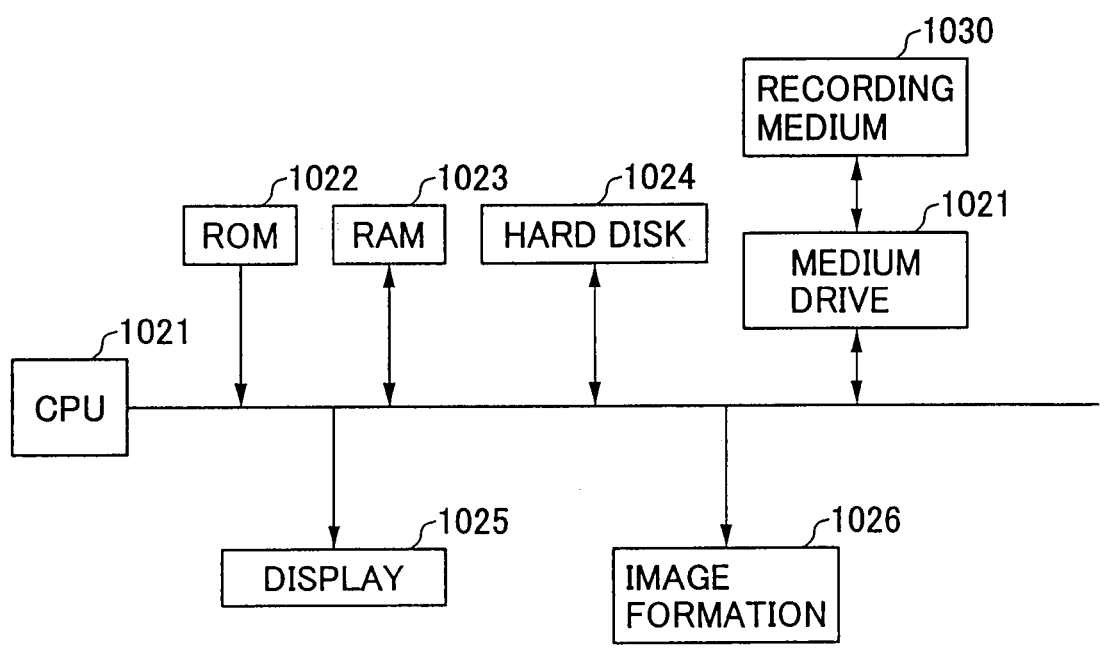
FIG. 49 shows a hardware configuration of an image processing system according to the fourth embodiment of the present invention.

FIG. 49 shows an example of hardware configuration of an image processing system shown in FIG. 28. As shown in the figure, a workstation, a personal computer, etc. realizing this image processing system includes a CPU 1021 which controls whole of the system, a ROM 1022 storing control programs and so forth for the CPU 1021, a RAM 1023 used as a work area of the CPU 1021, a hard disk drive 1024, a display device 1025 for displaying image data, and an image formation device 1026, such as a color printer.

There, the CPU 1021, ROM 1022, RAM 1023, and hard disk 1024 gave functions as the computer 1210 shown in FIG. 28. In this case, the function of the image processing device 1101 of FIG. 27 can be borne by the CPU 1021. That is, the function as the image processing device of the present invention can be borne by the CPU 1021.

Also in a form of software package (specifically information recording medium, such as CD-ROM), the functions of the image processing device in the CPU 1021 according to the present invention may be provided, for example. Therefore, in the example of FIG. 49, when information recording medium 1030 is loaded, a corresponding medium drive 1031 drives it.

In other words, the image processing device and image processing method according to the present invention may be embodied also in a device configuration such that a software program recorded in an information recording medium such as a CD-ROM is read out by a general-purpose computer system equipped with an image scanner, a display device, etc.

and a microprocessor of this general-purpose computer system performs the background area color range setting processing according to the fourth embodiment of the present invention. In this case, the program (namely, a program used by the hardware system) for performing the image processing according to the present invention is provided in the state where it is recorded in the recording medium. The recording medium storing the program etc. is not limited the CD-ROM, but a ROM, a RAM, a flexible disk, a memory card, etc. may also be used for the same purpose. As a result of being installed in the storage device 1024 included in the hardware system, for example, a hard disk drive, the program recorded in the recording medium can be actually executed, and, thus, the image processing function according to the present invention can be realized.

Moreover, the program for realizing the image processing device and the image processing method according to the present invention may be provided not only in the form of a recording medium, but may also be provided by communication with a server via LAN, Internet of the like.

Further, the present invention is not limited to the above-described embodiments, and variations and modifications may be made without departing from the scope of the present invention.

The present application is based on Japanese priority applications Nos. 2001-259224, 2001-176455 and 2001-175619, filed on Aug. 29, 2001, Jun. 12, 2001 and Jun. 11, 2001, respectively, the entire contents of which are hereby incorporated by reference.

What is claimed is:

1. An image processing apparatus comprising:
    a color range setting unit setting a color range for a background area of input color image data by using information on a background candidate area having a high possibility of belonging to the background area; and
    a background extracting unit extracting the background area from the input color image data by using the color range set by said color range setting unit,
    wherein: said color range setting unit sets a color range for background area in a target division area by using information of a peripheral division area present in the vicinity of the target division area and having background color range information when no background candidate area exists in the target division area.

2. The image processing apparatus as claimed in claim 1, wherein: said color range setting unit sets a size of the color range for the background area according to a spread degree of color component in the background candidate area.

3. The image processing apparatus as claimed in claim 1, wherein: said color range setting unit sets the color range for the background area by using an average value and a standard deviation value concerning a color component of the background candidate area.

4. The image processing apparatus as claimed in claim 1, wherein: the background candidate area of a night photographic scene image is determined as corresponding to the darkest level out of a plurality of levels obtained from classification of the input image data with respect to the brightness.

5. The image processing apparatus as claimed in claim 1, wherein: the background candidate area of a backlight or half-backlight scene image is determined as corresponding to the brightest level out of a plurality of levels obtained from classification of the input image data with respect to the brightness.

6. The image processing apparatus as claimed in claim 1, wherein: said color range setting unit sets a color range for background area in a division area by using information of a background candidate area having a high possibility of belonging to the background area existing in the division area.

7. An image processing method comprising the steps of:
a) setting a color range for a background area of input color image data by using information on a background candidate area having a high possibility of belonging to the background area; and
b) extracting the background area from the input color image data by using the color range set by said color range setting unit; and
wherein: said color range setting step sets a color range for background area in a target division area by using information of a peripheral division area present in the vicinity of the target division area and having background color range information when no background candidate area exists in the target division area.

8. A computer-readable information recording medium storing therein a software program for causing a computer to perform the steps of:
setting a color range for a background area of input color image data by using information on a background candidate area having a high possibility of belonging to the background area; and
extracting the background area from the input color image data by using the color range set by said color range setting unit; and
wherein: said color range setting step sets a color range for background area in a target division area by using information of a peripheral division area present in the vicinity of the target division area and having background color range information when no background candidate area exists in the target division area.

* * * * *